April 29, 1952 C. E. BEALE 2,594,719

VOICE-FREQUENCY TELEPHONE SIGNALING SYSTEM

Filed April 25, 1946 14 Sheets-Sheet 1

INVENTOR
CHARLES EDMUND BEALE
BY Chas. W. Candy
ATTORNEY

April 29, 1952 C. E. BEALE 2,594,719

VOICE-FREQUENCY TELEPHONE SIGNALING SYSTEM

Filed April 25, 1946 14 Sheets-Sheet 2

INVENTOR
CHARLES EDMUND BEALE

BY Chas. L. Cardy
ATTORNEY

April 29, 1952 C. E. BEALE 2,594,719

VOICE-FREQUENCY TELEPHONE SIGNALING SYSTEM

Filed April 25, 1946 14 Sheets-Sheet 3

INVENTOR
CHARLES EDMUND BEALE

BY Chas. W. Candy
ATTORNEY

INVENTOR
CHARLES EDMUND BEALE
BY Chas. Tr. Candy
ATTORNEY

April 29, 1952 C. E. BEALE 2,594,719

VOICE-FREQUENCY TELEPHONE SIGNALING SYSTEM

Filed April 25, 1946 14 Sheets-Sheet 5

INVENTOR
CHARLES EDMUND BEALE

BY Chas. W. Candy

ATTORNEY

April 29, 1952 C. E. BEALE 2,594,719

VOICE-FREQUENCY TELEPHONE SIGNALING SYSTEM

Filed April 25, 1946 14 Sheets-Sheet 6

INVENTOR
CHARLES EDMUND BEALE

BY Chas. W. Candy
ATTORNEY

April 29, 1952 C. E. BEALE 2,594,719

VOICE-FREQUENCY TELEPHONE SIGNALING SYSTEM

Filed April 25, 1946 14 Sheets-Sheet 7

INVENTOR
CHARLES EDMUND BEALE

BY Chas. Tu. Candy

ATTORNEY

April 29, 1952 C. E. BEALE 2,594,719

VOICE-FREQUENCY TELEPHONE SIGNALING SYSTEM

Filed April 25, 1946 14 Sheets-Sheet 8

INVENTOR
CHARLES EDMUND BEALE

BY Chas. M. Candy

ATTORNEY

INVENTOR
CHARLES EDMUND BEALE
BY Chas. Tu. Candy
ATTORNEY

April 29, 1952 C. E. BEALE 2,594,719

VOICE-FREQUENCY TELEPHONE SIGNALING SYSTEM

Filed April 25, 1946 14 Sheets-Sheet 10

INVENTOR
CHARLES EDMUND BEALE

BY [signature]

ATTORNEY

April 29, 1952 C. E. BEALE 2,594,719

VOICE-FREQUENCY TELEPHONE SIGNALING SYSTEM

Filed April 25, 1946 14 Sheets-Sheet 11

INVENTOR
CHARLES EDMUND BEALE

BY Chas. W. Cassidy

ATTORNEY

INVENTOR
CHARLES EDMUND BEALE
BY Chas. Ku. Candy
ATTORNEY

April 29, 1952 C. E. BEALE 2,594,719

VOICE-FREQUENCY TELEPHONE SIGNALING SYSTEM

Filed April 25, 1946 14 Sheets-Sheet 13

INVENTOR
CHARLES EDMUND BEALE
BY Chas. W. Cundy
ATTORNEY

INVENTOR
CHARLES EDMUND BEALE
BY Chas. L. Candy
ATTORNEY

Patented Apr. 29, 1952

2,594,719

UNITED STATES PATENT OFFICE 2,594,719

VOICE-FREQUENCY TELEPHONE SIGNALING SYSTEM

Charles Edmund Beale, Liverpool, England, assignor to Automatic Electric Laboratories Inc., Chicago, Ill., a corporation of Delaware Application April 25, 1946, Serial No. 664,765
In Great Britain May 19, 1945

6 Claims. (Cl. 179—27)

Figure 1:
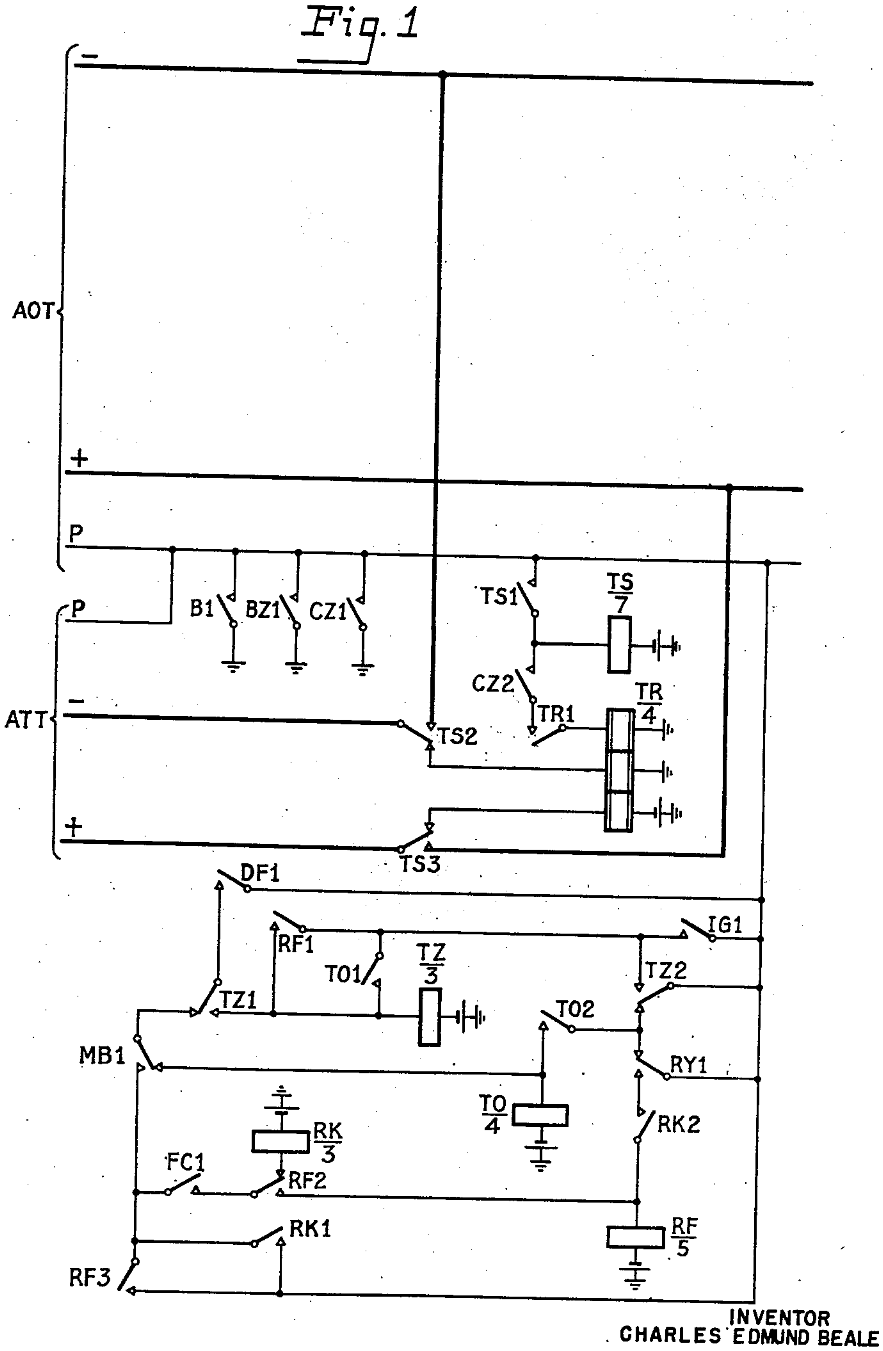
Figure 2:
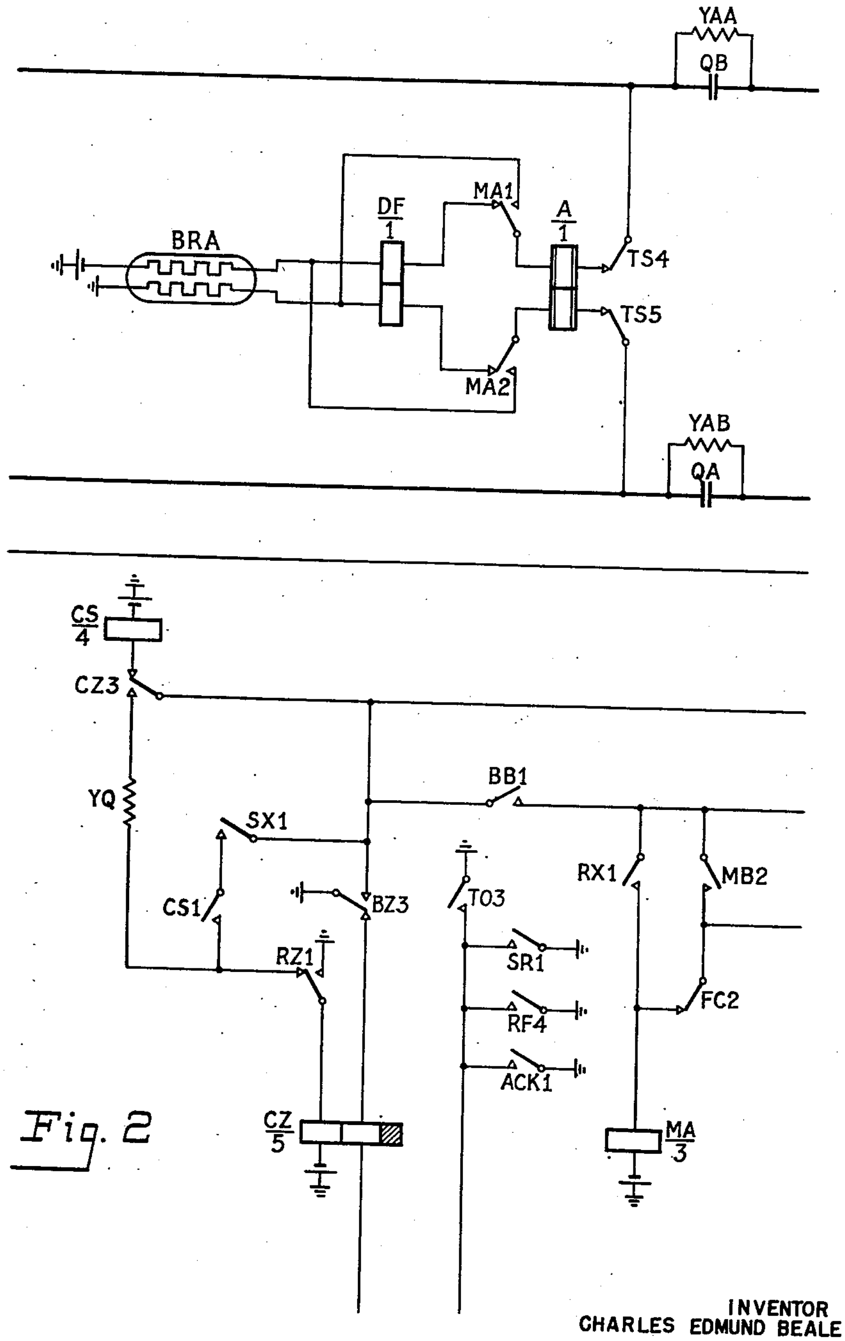
Figure 3:
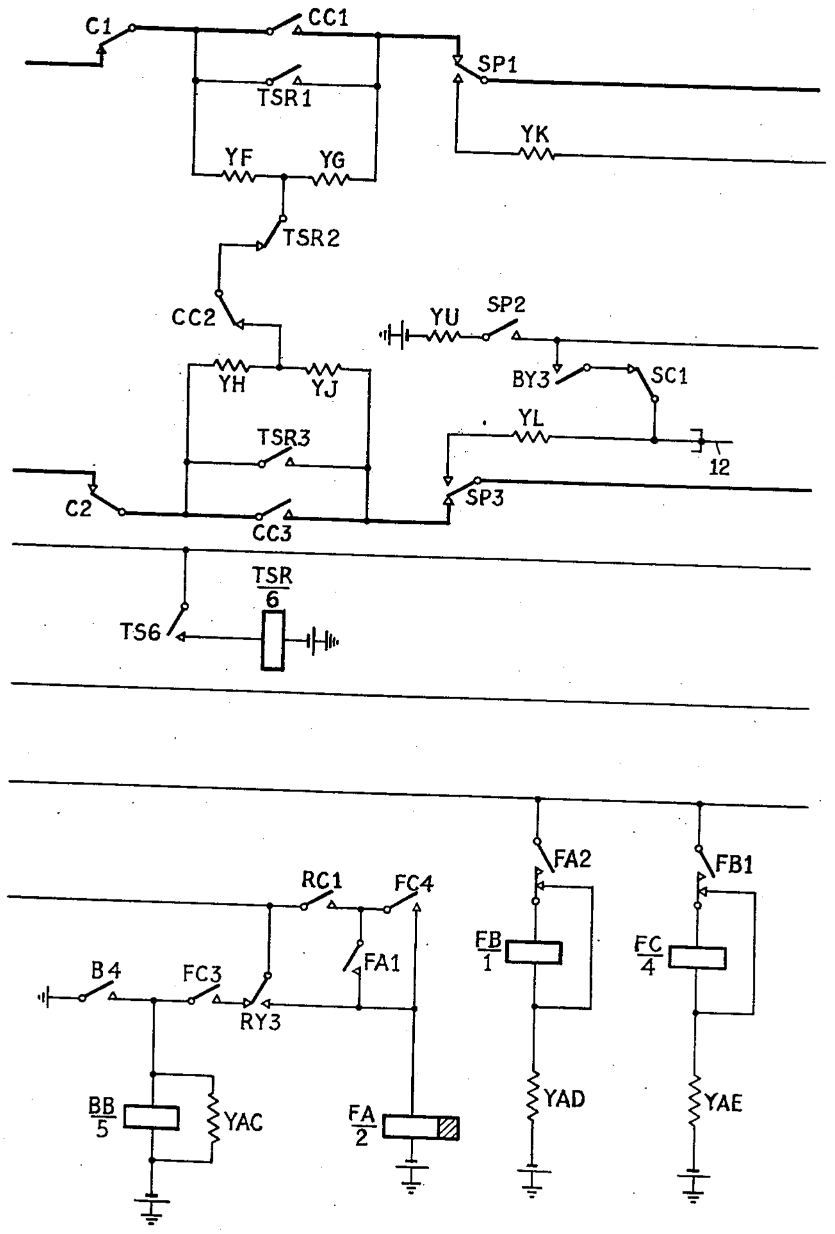
Figure 4:
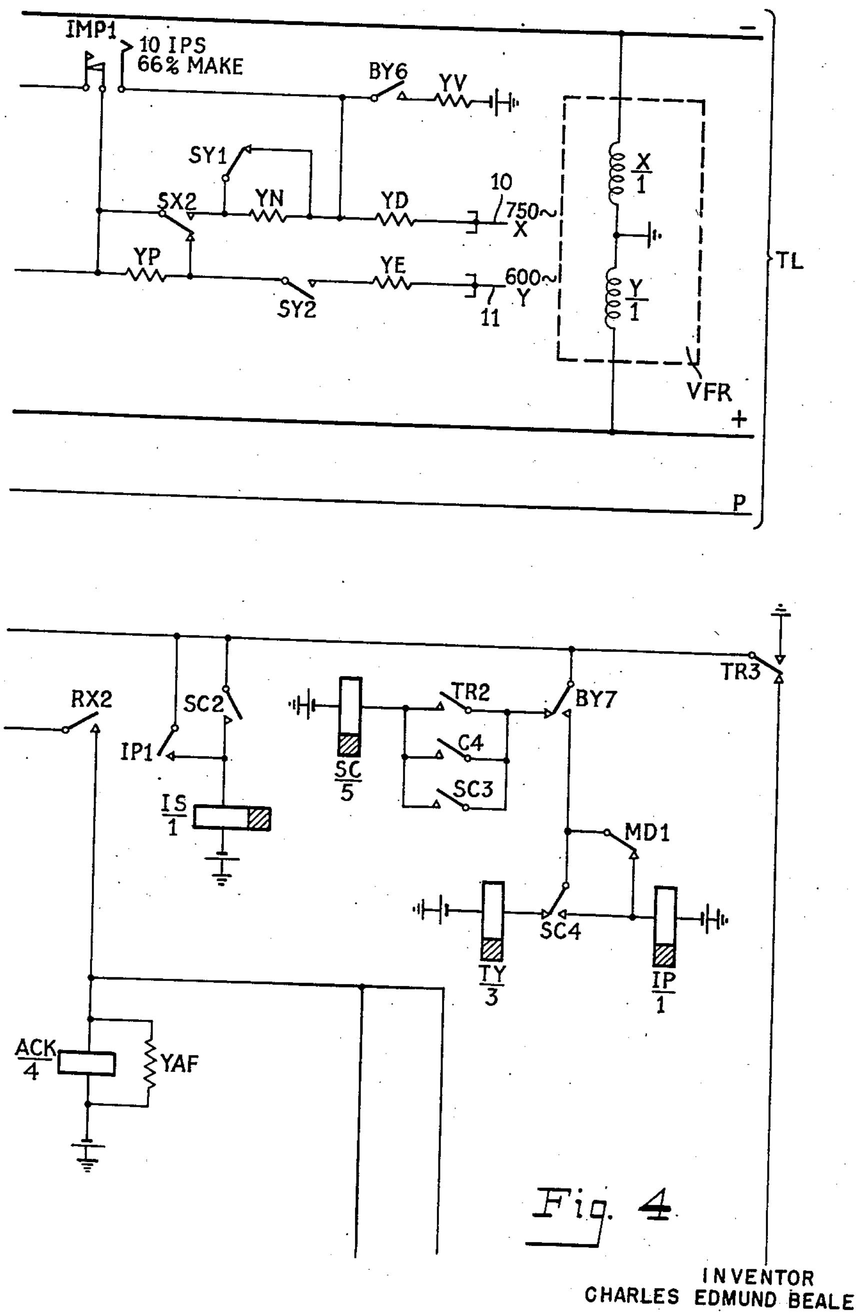
Figure 5:
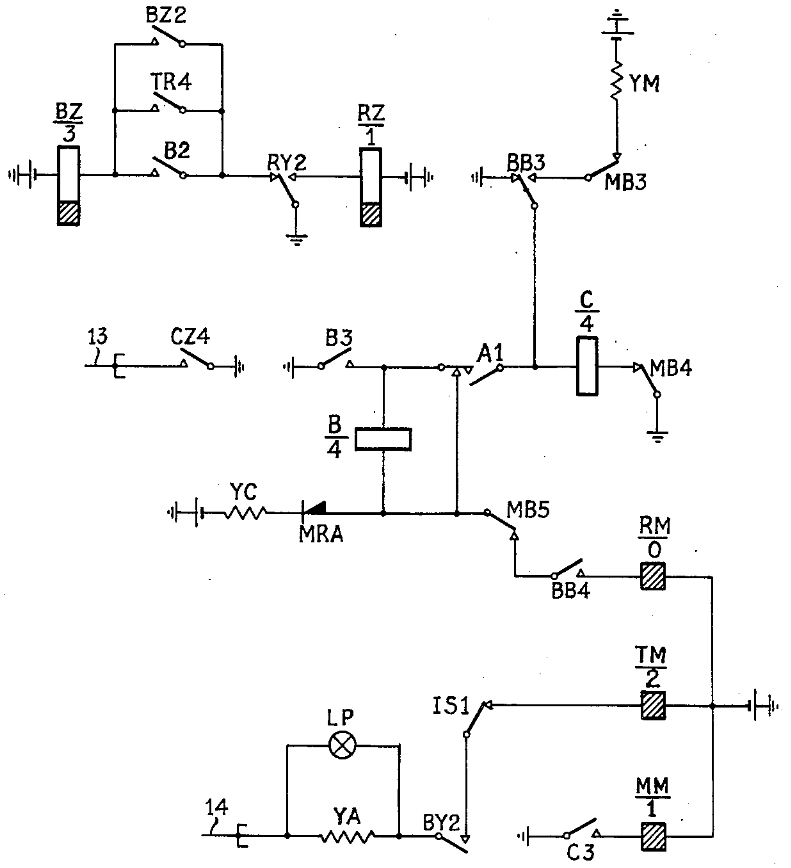
Figure 6:
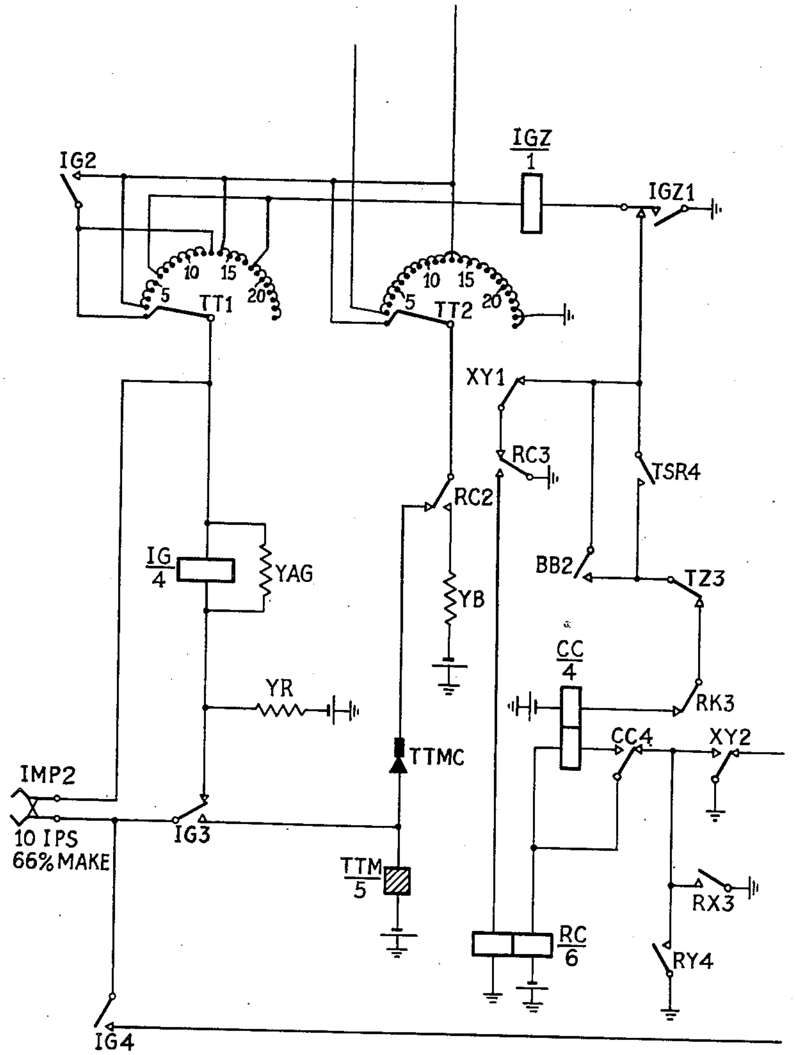

The present invention relates to telephone systems and is more particularly concerned with systems involving comparatively long trunk routes so that owing to the probability that voice amplifiers or repeaters will be used it is desirable for the supervisory and/or setting signals over some portions at least to be in the form of voice frequency impulses. This method of signalling has the advantage that the signals will readily pass through such repeaters, but it has the disadvantage that since the signals are in the same frequency range as the actual speech currents, there is a danger that supervisory and like signals will be simulated or mutilated by speech currents and special steps have therefore to be taken to prevent unreliable operation from this cause.

It is particularly important that setting impulses, when these are in the form of voice frequency currents, should not be either simulated or disturbed by means of speech currents, and one method which has already been adopted is to provide a one-way transmission element such as a thermionic valve in the speaking circuit so that speech or noise on the calling side of the circuit shall be unable to get on to the line, while audible signals such as busy tone can be transmitted back to the calling party. This method of operation, however, involves limitations in operating practice as a special signal has to be sent to render the circuit suitable for speech. This signal is normally the called subscriber answer signal which generally produces metering and hence difficulties are involved on service calls where metering is not desired.

A different solution of the problem may be obtained by arranging for the equipment which responds to setting impulses to be in a responsive condition only while the setting operation is taking place, and for calls from operators' positions this method is satisfactory since the operator indicates when dialling is completed by restoring her dialling key. If the system is to permit long distance subscriber dialling, however, other measures have to be taken to indicate when dialling is completed since normal operating practice does not require that the subscriber should indicate when he has finished dialling.

One suitable solution is to include impulse regenerators in the circuit whereby any desired amount of delay can be introduced into the transmission of voice frequency impulses, and according to one feature of the invention impulse regenerators of the mechanical type are employed and as soon as the regenerator moves off-normal, indicating that it has impulses stored waiting to be transmitted, a special signal is sent to condition the receiving equipment to respond to the impulses, while when the regenerator again restores to normal, indicating that all the stored impulses have been transmitted, a further signal is sent to restore the receiving equipment to an unresponsive condition so that it shall not be falsely operated by line noise or calling party's speech.

If the calling party dials in a straightforward manner, there will always be digits stored in the regenerator until the operation is completed, but if he should delay so that the regenerator disposes of all its stored digits, when a further digit is stored the special conditioning signal will again be transmitted and a further signal when the regenerator has again disposed of everything that is stored therein. With this arrangement it is readily possible to provide subscriber dialling without any need for a one-way transmission element which as indicated above introduces complications in operating practice.

It may be mentioned that if the connection being set up includes a plurality of voice frequency links in tandem, arrangements will be provided for through signalling and in this case though the regenerator at the second and possibly subsequent exchanges will not be used, it is still necessary to send the conditioning signal from the exchange at the outgoing end of each link taken into use though the restoring signal need only be sent from the originating exchange and will then pass over the whole connection to the terminating exchange.

Figure 9:
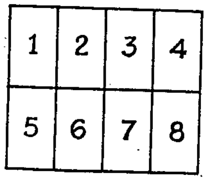
Figure 16:
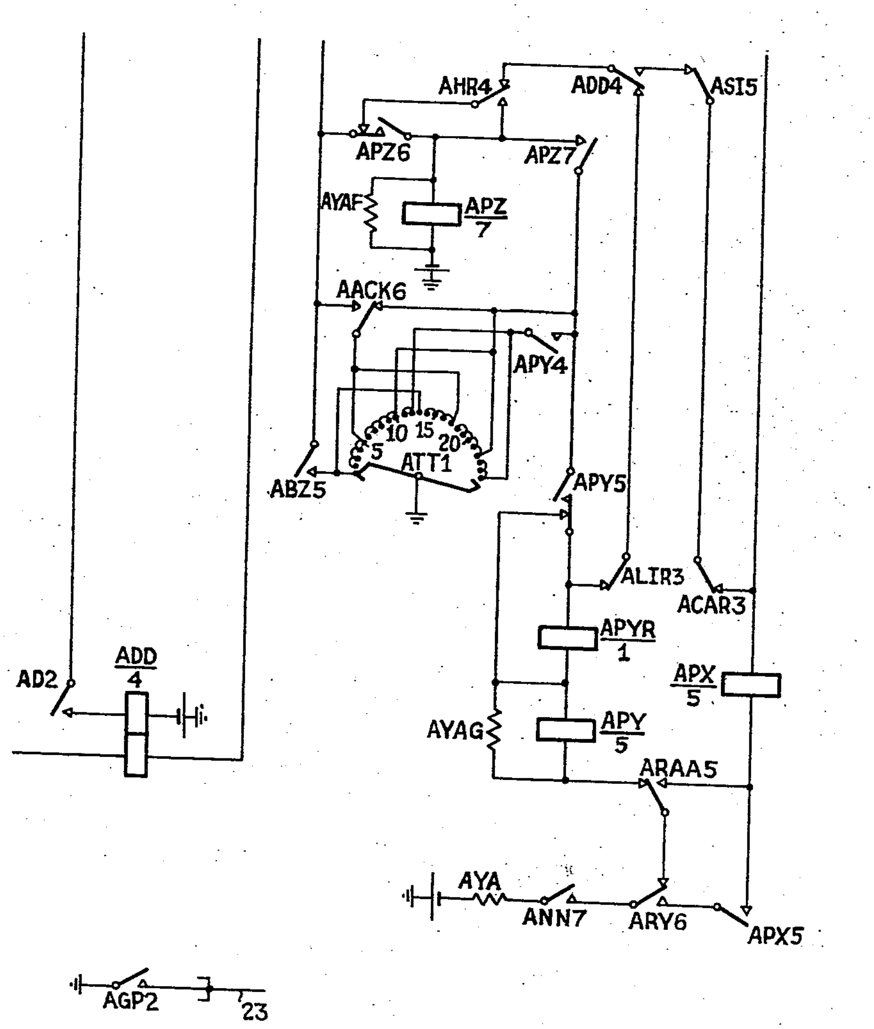
Figure 15:
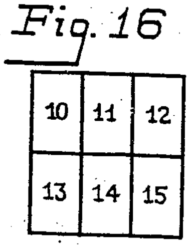

The invention will be better understood from the following description of one method of carrying it into effect which should be taken in conjunction with the accompanying drawings comprising Figs. 1–16. Of these, Figs. 1–8 when fitted together in the manner indicated in Fig. 9 show the circuit of an outgoing relay set, while Figs. 10–15 when fitted together in the manner indicated in Fig. 16 show the circuit of an incoming relay set. The general arrangement is assumed to be similar to that disclosed in the application of C. E. Beale et al., No. 584,620 filed March 24, 1945, now U. S. Patent 2,486,100, issued October 25, 1949, and as clearly set out in that specification, the signalling code employed makes use of a so-called prefix signal which consists of the two signalling frequencies applied simultaneously, and this is then followed after a short pause by the operative signal comprising one or other of the frequencies alone. Preferably, the frequencies employed will be 600 cycles/second which will be referred to as Y frequency, and 750 cycles/second which will be referred to as X frequency. The prefix signal comprising both frequencies applied together will be referred to as XY or a compound signal. All the codes used in the earlier arrangement are assumed to be employed in the present disclosure and in addition use is made of a conditioning signal comprising a short pulse of compound frequency while the signal for again rendering the receiving equipment unresponsive comprises a pulse of Y frequency not preceded by the compound prefix. For convenient reference in the understanding of the operation, the various signals are set out in the following table:

| | Forward. | Backward. |
|---|---|---|
| Seizing Signal | 80 ms. X. | |
| Conditioning for impulse reception. | 250 ms. XY. | |
| Impulsing | 70 ms. X each impulse. | |
| Restoration to insensitive condition. | 100 ms. Y. | |
| Called subscriber answer. | | 250 ms. XY. 35 ms. space. 70 ms. X. Repeated at intervals of 600 ms. until acknowledged. |
| Acknowledgment | 250 ms. XY. 35 ms. space. 70 ms. Y. | |
| Clear forward | 250 ms. XY. 35 ms. space. 70 ms. Y. Repeated at intervals of 700 ms. | |
| Release | | 250 ms. XY. 35 ms. space. 500 ms. Y. |
| Clear back | | 250 ms. XY. 35 ms. space. 70 ms. Y. Repeated at intervals of 600 ms. |
| Ring forward, trunk offering, breakdown or forward transfer. | 250 ms. XY. 35 ms. space. 70 ms. X. Repeated at intervals of 700 ms. until acknowledged. | |
| Acknowledgment | | 250 ms. XY. 35 ms. space. 70 ms. Y. |

It will be appreciated that as a matter of convenience round figures for the durations of the signals have been given above and that in practice the lengths may be varied within assigned limits and still produce correct operation of the equipment. It should also be mentioned that as will appear subsequently, in certain circumstances the ring forward, etc. signal is acknowledged in a slightly different manner.

Considering now the detailed description, when the outgoing relay set of Figs. 1–8 is taken into use over the bracketed conductors AOT from a selector level for ordinary traffic, that is to say for a call which has not already made use of a voice frequency trunk line, the loop across the conductors — and + operates relay A in series with the barretter BRA and the differential relay DF which is not now operated. Relay A at contacts A1, Fig. 5, energises relay B in series with rectifier MRA and resistor YC and relay B thereupon at contacts B1, Fig. 1, earths the incoming P lead, at contacts B2, Fig. 5, completes a circuit for relay BZ, at contacts B3 completes a locking circuit for itself and at contacts B4, Fig. 3, energises relay BB. Relay BZ at contacts BZ1, Fig. 1, applies a further earth to the P lead, at contacts BZ2, Fig. 5, completes a locking circuit for itself and at contacts BZ3, Fig. 2, applies earth to the main holding lead thereby completing a circuit for relay CS. Relay BB at contacts BB1, Fig. 2, prepares circuits for the supervisory relays, at contacts BB2, Fig. 6, energises relay CC, at contacts BB3, Fig. 5, completes a circuit for relay C which is however at present short-circuited, at contacts BB4 prepares a circuit for the magnet RM of the regenerator and at contacts BB5, Fig. 8, opens a point in the circuit of relay SR. Relay CC at contacts CC1, CC2 and CC3, Fig. 3, removes the blocking effect of the short circuit across the line by way of the loss pad comprising resistors YF, YG, YH and YJ and at contacts CC4, Fig. 6, short-circuits its own lower winding to produce a slight release lag. Relay CS at contacts CS1 prepares a circuit for relay CZ, at contacts CS2 and CS3, Fig. 8, energises relay SX over wiper TT4 in the home position and at contacts CS4 energises relay SP. The latter relay at contacts SP1 and SP3, Fig. 3, prepares for the connection of the voice frequency signal generators to the line, at contacts SP2 connects up the high value resistor YU for providing a small amount of current flow through impulse spring IMP1 and at contacts SP4 prepares a locking circuit for itself which will not become effective at this stage. Relay SX, at contacts SX1, Fig. 2, completes a circuit for relay CZ and at contacts SX2 connects the X or 750 cycle frequency from common lead 10 by way of resistor YD, contacts SY1 and SX2, normally closed impulse springs IMP1 and resistor YK to the line, the return circuit being by way of resistor YL to common lead 12. A seizing pulse of X frequency is accordingly transmitted over the line and relay CZ is operated after a slight interval. Thereupon at contacts CZ1, Fig. 1, a further earth is connected to the P conductor, at contacts CZ2 a circuit is prepared for relay TS, at contacts CZ3, Fig. 2, relay CS is disconnected and a locking circuit completed for relay CZ, at contacts CZ4, Fig. 5, earth is connected to common lead 13 to start the impulse machine and at contacts CZ5, Fig. 7, a circuit is prepared for relay BY. Relay CS now releases and in turn brings down relays SP and SX to terminate the X pulse.

No further operations take place until the calling subscriber dials the first digit whereupon relay A responds accordingly and on each de-energisation transmits an impulse by way of contacts B3, A1, MB5 and BB4 to the stepping magnet RM of the regenerator. This is assumed to be of the type disclosed in United States Patent No. 2,188,461 granted January 30, 1940, to J. W. McClew et al., having a circular row of pins adapted to be pushed through a plate by a setting arm which is rotated step-by-step over the pins and is arranged to be tilted by a marking magnet so that it clears the pins during its movement. Relay C is also now able to operate and holds up throughout the series of impulses and at contacts C1 and C2, Fig. 3, disconnects the speaking leads to prevent impulsive surges being sent forward, at contacts C3 energises the marking magnet MM of the regenerator to tilt the setting arm and at contacts C4, Fig. 4, energises relay SC. This relay thereupon at contacts SC1, Fig. 3, opens a point in the circuit associated with the voice frequency generators, and which will be operative later when relay SP is energised, at contacts SC2 energises relay IS, at contacts SC3 completes a locking circuit for itself, at contacts SC4 prepares a circuit for relay IP and at contacts SC5, Fig. 7, closes another point in the alternative circuit for relay BY. Relay IS at contacts IS1, Fig. 5, opens a point in the circuit of the transmitting magnet TM of the regenerator.

The setting arm is accordingly rotated past a corresponding number of pins and when relay C de-energises at the end of the train, the marking magnet MM is released and causes the setting arm to displace the pin opposite which it is then located. As soon as the setting arm moves away from the transmitting arm, which is on the other side of the plate and is held at this stage, the off-normal contacts N, Fig. 7, close, and when the marking magnet MM releases, contacts MMC are closed and relay BY is therefore energised. This relay at contacts BY1 energises relay MD, at contacts BY2, Fig. 5, prepares a circuit for the transmitting magnet TM, at contacts BY3, Fig. 3, closes a point in the circuit associated with the voice frequency generators, at contacts BY4, Fig. 7, energises relay SP, at contacts BY5 completes a locking circuit for itself, at contacts BY6, Fig. 4, connects up battery through the high value resistor YV for applying a small amount of current to the make contacts of the impulse spring IMP1, at contacts BY7 opens the circuit of relay SC and energises relay IP, and at contacts BY8, Fig. 8, opens a point in an alternative circuit for relay SY. Relay IP now operates and at contacts IP1 maintains relay IS, while relay SC commences to release slowly.

Figure 7:
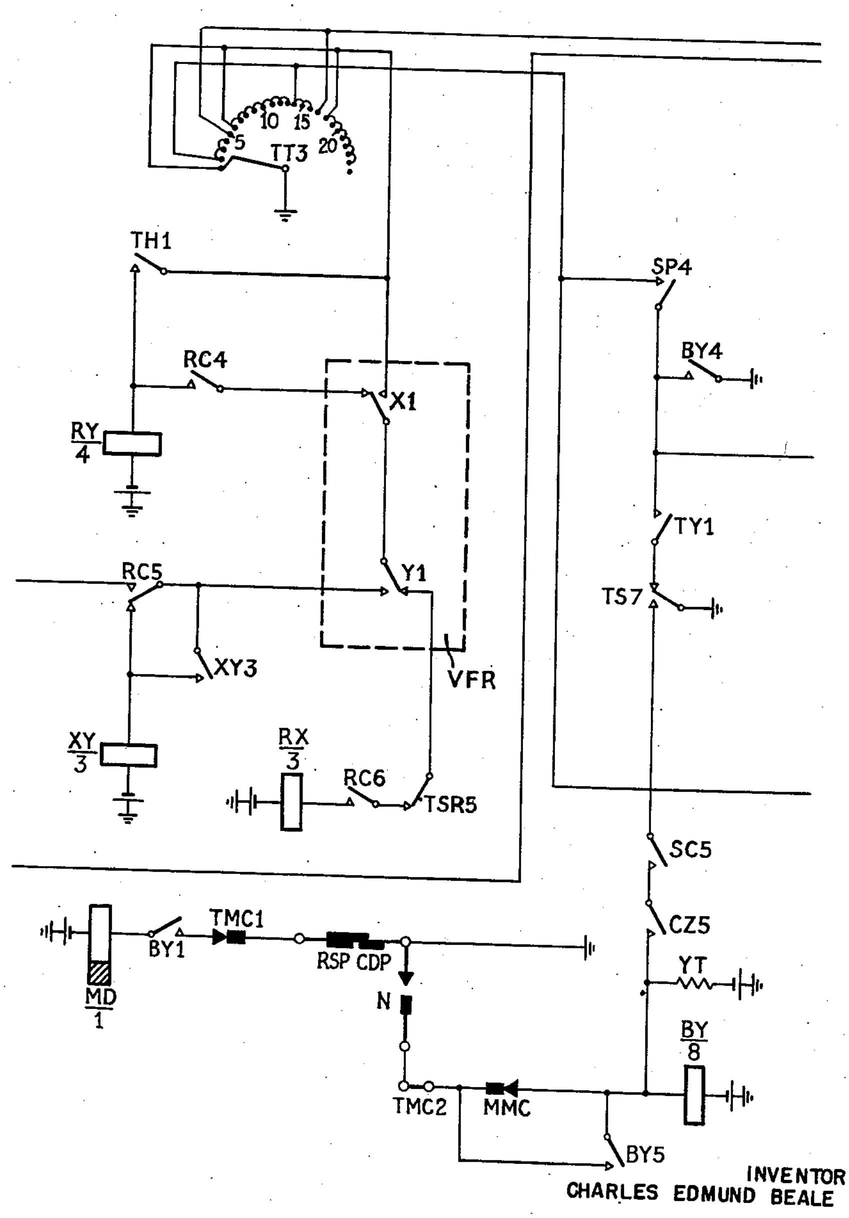
Figure 8:
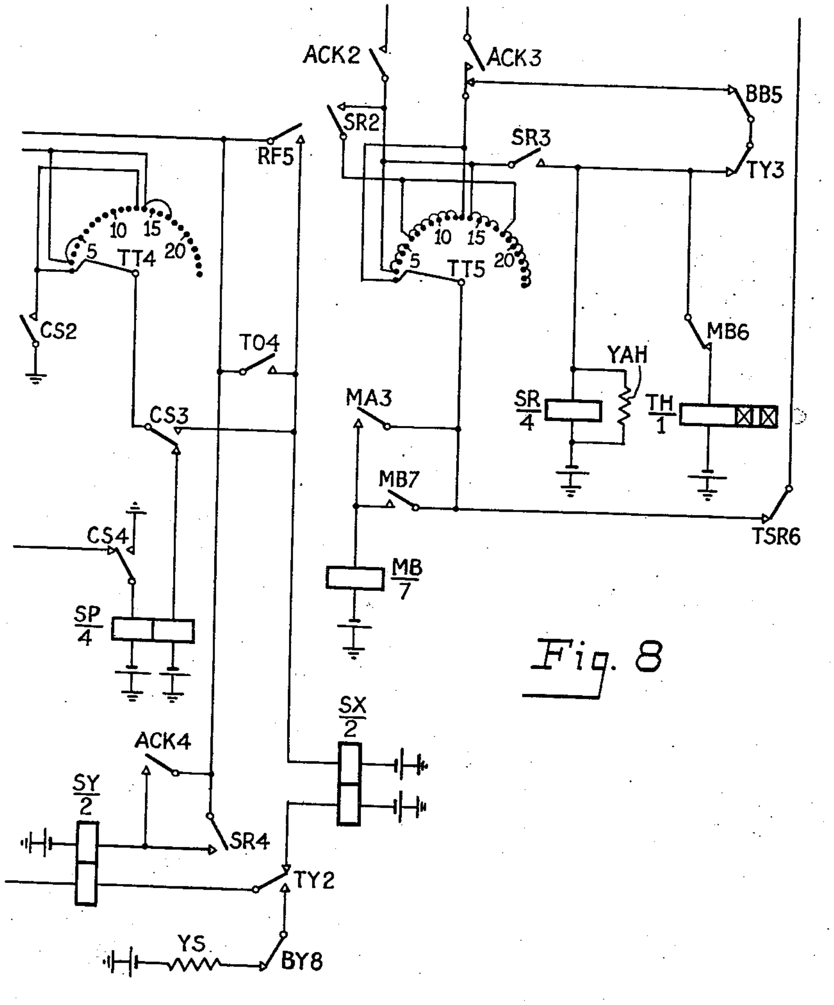

The operation of relay SP prepares the circuits for the signal generators as previously described and in addition earth is extended over contacts SP4, Fig. 7, to operate relays SY and SX in series. As a result, X frequency from lead 10 is now connected up by way of resistors YD and YN, while Y or 600 cycle frequency is connected up from common lead 11 over resistors YE and YP so that a compound signal is sent to line over normally closed springs IMP1 of the regenerator. It will be noted that when the two frequencies are being applied simultaneously, resistors are included in the circuit in order to reduce the level of each frequency and prevent overloading the amplifiers. Relay SC releases after its slow period and contacts SC4, Fig. 4, then completes a circuit for relay TY. This relay at contacts TY1, Fig. 7, completes an alternative circuit for relay SP which accordingly remains energised, at contacts TY2, Fig. 8, opens the circuit of relays SX and SY, and at contacts TY3 opens another point in the circuit of relay SR. Relays SX and SY now de-energise to end the compound conditioning pulse. At contacts SC1, relay SC closes a point in the circuit across the line. Since relay MD is now operated, relay IP releases slowly and thereupon opens the circuit of relay IS and after the slow period of this relay, contacts IS1, Fig. 5, close the circuit of the magnet TM. This accordingly operates to tilt the transmitting arm which thereupon restores the pin CDP left displaced after the previous operation, but owing to the stepped head of the re-setting pin RSP as indicated in Fig. 7, the transmitting arm is not yet able to commence its rotation. The magnet TM, however, opens its contacts TMC1, Fig. 7, and thus releases relay MD which after its slow period again completes the circuit for relay IP which then re-energises relay IS. The circuit of magnet TM is then opened and it de-energises, thereby disengaging the resetting pin RSP from the restored pin CDP and enabling the transmitting arm to move over the pin circle under governor control due to the action of a spring which was wound up when the setting arm was moved. During the movement of the transmitting arm the springs IMP1 are intermittently operated at a speed of 10 impulses per second and X frequency is therefore connected up and transmitted to line. When a number of impulses have been transmitted corresponding to the number dialled by the calling party, the transmitting arm will be arrested by the pin which was displaced by the first movement of the setting arm and thus the transmission of impulses will cease.

In the meantime, further incoming impulses may have been registered by further movements of the setting arm, a corresponding pin being displaced at the end of each train. In these circumstances, at the end of the first train of retransmitted impulses, the off-normal springs will still be closed and thus relay BY held operated. The further trains of impulses will then be retransmitted in turn, a suitable interdigital pause being introduced by the co-operation of relays MD, IP and IS.

When all the dialled impulses have been received and re-transmitted as voice frequency impulses, the transmitting arm will catch up with the setting arm. The contacts N, Fig. 7, will then be opened and relay BY will accordingly deenergize and will open the circuit of relay TY at contacts BY7. This relay is slow to release, however, and while it holds up a circuit is completed over contacts TS7 and TY1 for relay SP and also over resistor YS, contacts BY8, TY2, SP4, TY1 and TS7 for relay SY so that relay SY is now energised with the result that a pulse of Y frequency is transmitted to line. When relay TY releases, relays SP and SY both fall away and the Y pulse is terminated. This pulse it will be appreciated serves to render the impulse responding equipment again insensitive to X frequency currents so that it cannot be wrongly operated by speech currents. It will be clear that if the subscriber makes a prolonged pause in his dialling operation, the regenerator may discharge all the digits which it has stored, in which case the off-normal springs N will open and relay BY will be released. In consequence the Y frequency reconditioning signal will be transmitted in the manner just described. When the remaining digits are dialled, however, the resulting re-operation of relay BY will again result in the transmission of a compound conditioning signal so that the retransmitted voice frequency setting pulses can be satisfactorily received and when this transmission is finally completed, the usual Y signal will again be sent.

The connection should now have been fully set up and the wanted party is rung and when he replies, a supervisory signal consisting of compound followed by short X is sent back to the equipment of Figs. 1–8. The initial compound portion of this signal operates the relays X and Y in the voice frequency receiver VFR, Fig. 4, and consequently both these relays operate their contacts shown in the dotted rectangle in Fig. 7. Thereupon earth is extended over wiper TT3 in the home position and contacts RC5 to operate relay XY. This relay at contacts XY1, Fig. 6, releases relay CC, at contacts XY2 prepares a circuit for relay RC and at contacts XY3 completes a locking circuit for itself. Relay CC on releasing re-introduces the short-circuit across the line to block any further transmission of the signal and at contacts CC4 energises relay RC. This relay at contacts RC1, Fig. 3, prepares a circuit which will be not operative at this stage, at contacts RC2, Fig. 6, prevents operation of magnet TTM, at contacts RC3 opens a further point in the circuit of relay CC and short-circuits its own left-hand winding to produce a slight release lag, at contacts RC4 and RC5, Fig. 7, prepares a circuit for relay RY, and at contacts RC6 prepares a circuit for relay RX.

On the termination of the compound signal, relay XY releases but relay RC remains held until the arrival of the operative X signal. This accordingly results in the operation of relay X which then energises relay RX over wiper TT3. Relay RX at contacts RX1, Fig. 2, energises relay MA, at contacts RX2, Fig. 4, energises relay ACK and at contacts RX3, Fig. 6, maintains relay RC. Relay MA at contacts MA1 and MA2, Fig. 2, reverses the connection of relay A to the line for normal supervisory purposes, relay DF now being cut out, and at contacts MA3, Fig. 8, completes a circuit for relay MB. This relay at contacts MB1, Fig. 1, disconnects relay TO and prepares a circuit for relay RK, at contacts MB2, Fig. 2, completes a holding circuit for relay MA, at contacts MB3 and MB4, Fig. 5, opens points in the circuit of relay C, at contacts MB5 opens a point in the circuit of the magnet RM to prevent further operation of this magnet, at contacts MB6, Fig. 8, disconnects the thermostat relay TH and at contacts MB7 completes a locking circuit for itself. Relay ACK at contacts ACK1, Fig. 2, completes a self-interrupted circuit for the magnet TTM of the switch TT over wiper TT2 in home position after relay RC de-energises on the termination of the X signal, at contacts ACK2 and ACK3, Fig. 8, completes locking circuits for itself in positions 1—5 of the switch TT, and at contacts ACK4 prepares a circuit for relay SY. The wipers of the switch TT are are accordingly advanced to position 2 and a circuit is then completed over wiper TT3 for relays SX and SY in series. Moreover, earth is connected to wiper TT1 and when the impulse springs IMP2 next open after the wipers reach position 2, the short-circuit round relay IG is removed and it operates in series with resistor YR. Thereupon at contacts IG1, Fig. 1, it prepares a circuit for relay TZ, at contacts IG2, Fig. 6, prepares a locking circuit for itself in the home position of the switch TT, at contacts IG3 prevents the short-circuit being again completed round its own winding and connects the springs IMP2 to the magnet TTM and at contacts IG4 prepares a circuit for relay SP over wiper TT4 in position 2. The wipers are now stepped round at a speed of ten steps per second from earth provided in turn by contacts ACK1, RC3 and IGZ1. When the springs IMP2 next close relay SP operates and owing to the fact that relays SX and SY are already operated a pulse of compound frequency is connected to line. Relay SP locks up over its left-hand winding and contacts SP4 to earth on wiper TT3, and thus relays SP, SX and SY are maintained in positions 2, 3 and 4. Relays SP and SX release when the wipers step to position 5 but after a 33 ms. pause relay SP is re-operated over wiper TT4 when the springs IMP2 next close and also in this position relay SY is operated over wiper TT3 and contacts ACK4. The result is therefore that a Y pulse of 66 ms. duration is transmitted to the line.

When the wipers step to position 6, both relays SP and SY release so that the pulse is terminated but relay IG now remains held and the driving circuit is completed in series with the low resistance relay IGZ to earth at contacts RC3. Relay IGZ is accordingly operated and at its contacts IGZ1 provides a direct earth connection so as to avoid the danger of clipped pulses owing to the operation of relays XY or RC. Moreover, when the switch leaves position 5 relay ACK is released.

The normal result of the transmission of the acknowledgment signal is to terminate the sending of the called subscriber answer signal and consequently when the switch TT reaches its alternative home position 13, relay ACK is normal and no further stepping circuit is completed and relay IG releases and the circuits are left in the speaking condition. In case, however, the acknowledgment signal for some reason does not get through, a further supervisory signal will be received which will have the effect of operating relays XY, RC and RX as just described, with the result that relay ACK will be re-operated and when relay RC releases, the magnet circuit is again completed and the switch TT makes a further movement to transmit another acknowledgment signal.

It will first be assumed that at the end of the conversation the calling party hangs up first with the result that a clear forward signal of compound followed by short Y is transmitted forward as will now be described. When the loop is opened, relay A releases thereby short-circuiting relay B at contacts A1, but in this case owing to the operation of relay MB no pulse is transmitted to magnet RM nor is relay C operated. Relay B releases after its slow period and brings down relay BB whereupon relay MA is released and also a circuit is completed from earth over contacts BZ3, TR3, TSR6, wiper TT5 in home position, contacts ACK3, BB5 and TY3 for relay SR. This relay at contacts SR1, Fig. 2, initiates the stepping of the switch TT, at contacts SR2 and SR3, Fig. 8, prepares locking circuits for itself in positions 2—12 of the switch and at contacts SR4 prepares a circuit for relay SY. The operation of the switch is now similar to that previously described for the acknowledgment of the called subscriber answer signal and again compound followed by Y is transmitted to line by the operation of relays SP, SX and SY. Relay SR remains steadily operated throughout the switch movement and if conditions are the same when the switch reaches its next home position the signal is repeated.

When the called party also hangs up, a release signal is transmitted back comprising compound followed by long Y, and this has the effect of releasing the equipment of Figs. 1-8 as will now be described. The compound signal cannot be effective in position 2—5 of the switch TT, that is to say while the forward signal is being transmitted, but in any other position it results in the completion of a circuit for relay XY which as before releases relay CC to produce line splitting and energises relay RC. On the termination of the compound signal, relay XY releases but relay RC remains energised and when the subsequent Y signal is received relay RY is operated over contacts XY2, RC5, Y1, X1 and RC4. Thereupon at contacts RY1, Fig. 1, it changes over the circuits of relays TO and RF, at contacts RY2, Fig. 5, opens the circuit of relay BZ and energises relay RZ, at contacts RY3, Fig. 3, closes a point in a circuit for relay FA and at contacts RY4, Fig. 6, completes a holding circuit for relay RC. Relay RY is maintained energised sufficiently long to cause the release of relay BZ which thereupon at contacts BZ3 removes earth from the holding lead and thus releases relay MB and opens the normal holding circuit for relay CZ. Relay RZ completes an alternative circuit for relay CZ which therefore at contacts CZ1 maintains the relay set guarded until all the equipment is restored to normal. A circuit for relay CZ is also completed by way of its low resistance right-hand winding if the switch TT is moved from its home position and thus guarding is assured in these circumstances.

If the called party hangs up first, the conditions are slightly different in that a clearing signal comprising compound followed by short Y is being sent back at the time the calling party hangs up. The Y component of this signal is not of sufficient duration to effect the release of relay BZ and produces operation of relays FA, FB and FC. If the calling party is on the line when the called party hangs up, relay BB will still be operated and hence when relay RY operates, contacts RY3 complete a circuit for relay FA. This relay at contacts FA1 completes a locking circuit for itself and at contacts FA2 energises relay FB. Thereupon at contacts FB1 relay FC is operated and at contacts FC1, Fig. 1, prepares a circuit for relay RK, at contacts FC2, Fig. 2, releases relay MA to reverse the current back to normal in the calling direction and again include relay DF in circuit, at contacts FC3, Fig. 3, prepares a locking circuit for relay BB and at contacts FC4 completes an alternative circuit for relay FA. At the end of the signal when relays RY and RC release in turn, relay BB is held while relay FA has its circuit opened and opens the circuit of relay FB when it releases after its slow period. Relay FB then opens the circuit of relay FC which like relay FB is rendered slow to release by being short-circuited. Normally the signal is repeated before relay FC has released and relays FA and FB therefore operate and relay FC has its circuit again completed. It will be noted that in these circumstances relay FA is energised over contacts RC1 and FC4 as soon as relay RC operates. If the calling party now hangs up, relays A and B release as before and at contacts BB5 complete the circuit for relay SR. The switch TT can only be stepped off normal while relay RC is normal owing to the effect of contacts RC2, and it then transmits the regular clear forward signal in the intervals between the successive periods of the clear back signal and as before the release signal is then transmitted back to clear down the equipment of Figs. 1–8.

If the called party is trying to attract the attention of a calling operator and thus opens and closes the line intermittently, the effect is to cause the equipment at the incoming end to lengthen the interval between repetitions of the clear back signal and this interval is sufficient to permit the release of relay FC. Accordingly since relay MB is still operated, contacts FC2 re-energise relay MA which by again reversing the connections of the speaking leads extinguishes the operator's supervisory lamp. When the next signal is received, relays FA, FB and FC operate in turn and relay MA is again released and the lamp is lighted. Thus a flashing effect is produced in accordance with regular practice. If the called party again maintains the receiver off the hook, the clear back signal is terminated as will subsequently appear.

If the calling party is an operator, it is possible for her to transmit a special signal which may be used for producing re-ringing, trunk offering, breakdown or forward transfer according to the time at which it is transmitted and the arrangements at the distant exchange. This signal comprises the usual compound signal followed by a short X frequency signal and it is repeated until acknowledged from the distant end. In this case also if it is transmitted in the face of a clear back signal, as would be the case if it were used for re-ringing, the acknowledgment signal comprises lengthening of the interval between repetitions of the clear back signal.

When the operator wishes to signal, she applies unbalance to the line which causes the operation of relay DF, and assuming first that the wanted party has not replied so that relay MB is not operated but instead busy tone is being returned, earth from the P conductor is then extended by contacts DF1, Fig. 1, to operate relay TO. This thereupon at contacts TO1 prepares a circuit for relay TZ, at contacts TO2 completes a locking circuit for itself, at contacts TO3, Fig. 2, initiates the usual operation of the switch TT, and at contacts TO4, Fig. 8, prepares a circuit for relay SX. The switch TT therefore commences to step in the usual manner and when relay IG operates, at contacts IG1 it completes a circuit for relay TZ. This thereupon at contacts TZ1 completes a locking circuit for itself, at contacts TZ2 renders relay TO dependent upon relay RY and at contacts TZ5, Fig. 6, releases relay CC so as to split the line. When the switch TT reaches position 2, relays SX and SY are operated and when relay IG operates, relay SP also is energised. The usual compound signal is therefore transmitted while the switch is passing over positions 2, 3 and 4, but in this case in position 5 relay SX is operated over its upper winding so that an X signal is transmitted to line. The switch then steps on to its home position in the usual manner and if by the time it reaches this position no acknowledgment signal has been received, the initial conditions still exist and the transmission of a further signal takes place.

The acknowledgment signal is as usual compound followed by short Y and when the compound signal becomes effective after the switch TT reaches position 6, relay XY is operated followed immediately by relay RC since relay CC is already released. The succeeding Y signal operates relay RY which, in addition to performing the operations previously described, at contacts RY1, Fig. 1, releases relay TO. Consequently when the switch TT next reaches its home position, no further circuit is completed for stepping it off-normal and the transmission of the signal ceases. It will be appreciated that relay TZ is provided to ensure that the signal is sent only as long as is necessary, even if the operator retains her key thrown. When the key is restored, relay TZ releases and the original conditions are again established.

Assume now that the conditions are such that the forward signal is transmitted after the called subscriber has replied and has subsequently hung up. In this case relay MB will be operated and the clear back signal will be coming in. Consequently relay FC is operated and hence when relay DF energises due to the unbalance, a circuit will be completed for relay RK. This thereupon at contacts RK1 completes a locking circuit for itself, at contacts RK2 prepares a circuit for relay RF and at contacts RK3, Fig. 6, releases relay CC to produce the usual line splitting operation. When relay RY next operates in response to the clear back signal, contacts RY1 energise relay RF which thereupon at contacts RF1 prepares a circuit for relay TZ, at contacts RF2 disconnects relay RK and completes a locking circuit for itself, at contacts RF3 closes another point in this locking circuit, at contacts RF4, Fig. 2, initiates the stepping of the switch TT, and at contacts RF5, Fig. 8, prepares a circuit for relay SX. It will be appreciated that as regards the operation of the switch TT the same effect has been produced as by the operation of relay TO and the re-ringing signal is therefore transmitted forward. In this case, however, it has to be sent in the intervals between successive clear back signals and as already pointed out the acknowledgment signal comprises a lengthening of the intervals between these signals. When such lengthening takes place, relay FC is caused to release and therefore at contacts FC1 brings down relay RF. The switch TT therefore moves to its next home position and the transmission of the forward signal is then terminated.

A further case remains to be considered, viz. that in which the outgoing relay set of Figs. 1–8 is taken into use for the extension of a call which has already been set up over a voice frequency trunk. This represents a so-called transit call in which the setting impulses already in voice frequency form can be transmitted straight through without any intermediate conversion into direct current signals. In this case, therefore, the impulse regenerator does not come into use, but to cover the normal case in which dialling continues uninterruptedly, it is necessary that a conditioning signal shall be sent forward over the trunk line independently of the the operation of the impulse regenerator. The manner in which this is effected will now be described.

When the relay set is taken into use over the lower set of bracketed conductors ATT, relay TR is operated over the loop. It will be noted that the connections by way of relay TR are in the opposite sense to those by way of relay A and this produces a controlling effect on the incoming relay set as will be described subsequently in connection with Figs. 10–15. Relay TR operates and at contacts TR1 prepares a circuit for relay TS, at contacts TR2, Fig. 4, completes a circuit for relay SC, at contacts TR3 applies earth to the holding lead and at contacts TR4, Fig. 5, completes a circuit for relay BZ. The effect of contacts TR3 is to secure the operation of relay CS slightly before relay BZ operates so that the seizing signal is sent out with the minimum loss of time. Relay BZ otherwise produces the effects previously described and relay CZ is operated to terminate the seizing signal. Thereupon at contacts CZ2, Fig. 1, relay TS is operated in series with the upper winding of relay TR. Relay TS at contacts TS1 completes a locking circuit for itself and short-circuits the upper winding of relay TR, at contacts TS2 and TS3 disconnects the other windings of relay TR and connects the speaking leads through to the outgoing side of the relay set, as contacts TS4 and TS5, Fig. 2, disconnects relays A and DF from the speaking leads, at contacts TS6, Fig. 3, energises relay TSR and at contacts TS7, Fig. 7, completes a circuit for relay BY. Relay TSR at contacts TSR1, TSR2 and TSR3 cuts out the loss pad so as to remove any hindrance to the direct passage of voice frequency currents independently of relay CC, at contacts TSR4, Fig. 6, completes a circuit for relay CC, at contacts TSR5, Fig. 7, opens a point in the circuit of relay RX and at contacts TSR6, Fig. 8, removes the operating earth from the circuits of relays MB and SR. Relay BY as before brings up relay SP and subsequently relays SX and SY so that a compund signal is sent to line during the release time of relay SC. When relay SC releases, it opens the circuit of relay BY which accordingly releases also. No circuit is completed in this case to cause the sending of the Y signal indicating the termination of the transmission of impulses, and this signal is in fact transmitted from the impulse regenerator on which the dialled impulses were originally stored.

The incoming voice frequency pulses are now therefore transmitted straight through the outgoing relay set and though this is responsive to a compound signal to cause the operation of relay XY, the release of relay CC and the operation of relay RC, relay RX cannot be operated in response to an X frequency supervisory signal and though relay RY can be operated by a Y signal, the only contacts of this relay which can be effective are contacts RY2 and these only produce any result in response to the long release signal. This it will be appreciated causes the release of relay BZ and thus clears down the relay set in substantially the manner previously described.

It may be pointed out that if the trunk associated with the outgoing relay set should be open it would be impossible for a release signal to be transmitted back to effect release. It is therefore arranged that when the calling party hangs up and relay BB releases a circuit is completed from earth over contacts BZ3, TR3, TSR6, wiper TT5 in home position, contacts ACK3, BB5, TY3 and MB6 for the thermostat relay TH in parallel with relay SR which operates to initiate the clear forward signal. After a suitable interval, say 10 seconds, relay TH energises and when clear forward is not being transmitted completes a direct circuit over wiper TT3 and contacts TH1 for relay RY. This then remains operated for sufficiently long to effect the release of relay BZ whereupon earth is removed from the holding lead to permit the release of the thermostat relay TH and subsequently relay RY whereupon relays RZ and CZ release in turn and the circuit is restored to normal in the usual manner.

Figure 10:
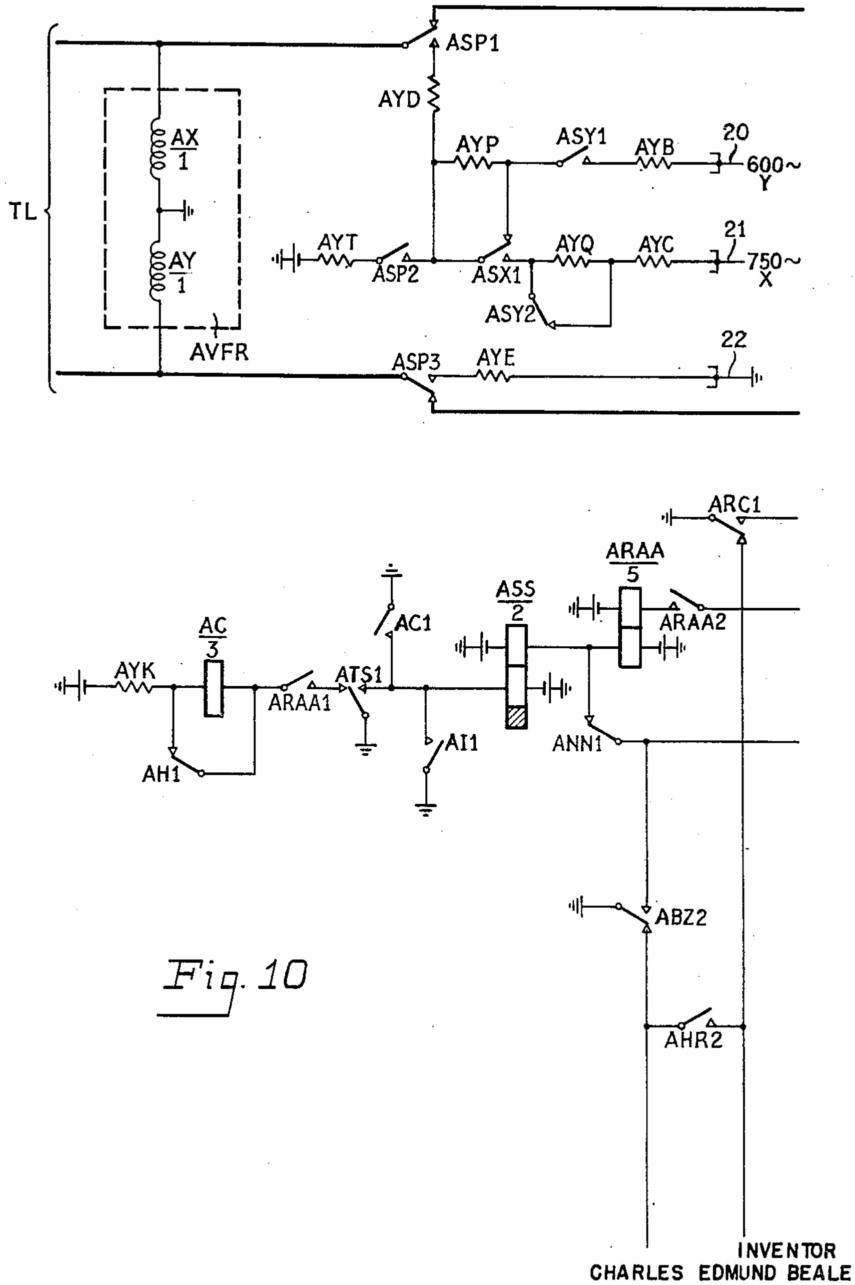

Consideration will now be given to the operations which take place in the incoming relay set illustrated in Figs. 10–15. When the seizing pulse of X frequency is received, relay AX in the voice frequency receiver AVFR, Fig. 10, is operated and at its contacts AX1, Fig. 14, completes a circuit over wiper ATT3 in home position and contacts AY1, ARC4 and ANN5 for relay ABZ. Relay ABZ at contacts ABZ1, Fig. 13, prepares a stepping circuit for the magnet ATTM, at contacts ABZ2, Fig. 10, connects earth to the holding lead, at contacts ABZ3, Fig. 13, energises relay ACC, at contacts ABZ4, Fig. 14, completes a locking circuit for itself and at contacts ABZ5, Fig. 15, prepares the supervisory circuits. Relay ACC at contacts ACC1 prepares stepping circuits for the switch ATT, at contacts ACC2 short-circuits its lower winding and opens a point in the circuit of relay ARC and at contacts ACC3, Fig. 11, prepares a circuit for relay ASG. The operation of contacts ABZ2 energises relays ASS and ARAA in parallel and the former at contacts ASS1 and ASS2, Fig. 12, prepares the outgoing loop circuit, while relay ARAA at contacts ARAA1 prepares a circuit for relay AC, at contacts ARAA2 completes a locking ciruit for itself by way of its upper winding, at contacts ARAA3, Fig. 11, prepares a circuit for relay ANN, at contacts ARAA4, Fig. 12, completes the outgoing loop, and at contacts ARAA5, Fig. 16, prepares a circuit for relay APX. When the outgoing loop is completed, relay AI operates and at contacts AI1, Fig. 10, completes an alternative circuit for relay ASS. Relay AD is included in series with relay AI but is polarised by the rectifiers AMRB and AMRC and does not now operate. Contacts ABZ2 also energise relay AGP which at contacts AGP1, Fig. 12, connects earth by way of the rectifier AMRA to the outgoing P conductor and at contacts AGP2, Fig. 15, connect earth to common lead 23 to start the impulse machine. At the end of the seizing pulse, relay AX releases and earth by way of contacts ARY3 is then extended over contacts ANN4 and ARAA3 to operate relay ANN. This relay thereupon at contacts ANN1, Fig. 10, opens the initial circuit of relays ASS and ARAA, at contacts ANN2, Fig. 11, completes an alternative circuit for relay AGP, at contacts ANN3 completes a locking circuit for itself, at contacts ANN4, Fig. 14, opens a point in its initial circuit, at contacts ANN5 opens the initial circuit of relay ABZ and prepares a circuit for the high speed relays AA and AH, at contacts ANN6, Fig. 12, closes an alternative point in the outgoing loop and at contacts ANN7, Fig. 15, closes a further point in the circuit of relay APX.

No further changes take place until the arrival of the conditioning compound signal immediately preceding the transmission of setting impulses. This signal operates both relays AX and AY and these at contacts AX1 and AY1, Fig. 14, complete a circuit for relay AXY from earth at wiper ATT3. This relay at contacts AXY1, Fig. 11, prepares a circuit for relay ASG, at contacts AXY2, Fig. 13, opens the circuit of relay ACC, at contacts AXY3, Fig. 14, completes a locking circuit for itself and at contacts AXY4 prepares a circuit for relay ARC. Relay ACC now releases and at contacts ACC2 completes the circuit for relay ARC and at contacts ACC3, Fig. 11, completes the circuit for relay ASG. This relay thereupon at its contacts ASG1, ASG2 and ASG3 completes a shunt across the line by way of the loss pad comprising resistors AYF, AYG, AYH and AYJ so as to produce a splitting effect. Relay ARC at contacts ARC1, Fig. 10, completes an alternative circuit for relay ASG and opens an additional point in the circuit of relay ACC, at contacts ARC2, Fig. 13, short-circuits its upper winding and opens a point in the circuit of the magnet ATTM, at contacts ARC3, Fig. 14, opens the initial circuit of relay AXY, at contacts ARC4 prepares a circuit for relay ARX, at contacts ARC5 prepares a circuit for relay ARY and at contacts ARC6, Fig. 12, completes a circuit for relay AST. Relay AST at contacts AST1 connects up the lower winding of relay ASI which is however at present short-circuited.

On the termination of the compound signal, the circuit of relay AXY is opened and it releases followed after a short interval by relay ARC which is slightly slow due to its short-circuited upper winding. When contacts ARC6 open, relay ASI energises in series with relay AST and at contacts ASI1, Fig. 11, prepares an alternative circuit for relay ASG which is completed on the re-operation of relay ACC, at contacts ASI2, Fig. 14, prepares a holding circuit for itself, at contacts ASI3 connects up the high speed relays AA and AH, at contacts ASI4, Fig. 12, opens a further point in the initial short-circuit round its lower winding and at contacts ASI5, Fig. 15, opens a point in the circuit of relay APX.

The setting impulses are now transmitted in the form of X pulses and relay AX responds accordingly. Each time it operates a circuit is completed from earth over wiper ATT3 in home position, contacts AX1, AY1, ARC4, ANN5 and ASI3 for relays AA and AH. Relay AA at its contacts AA1, Fig. 12, opens the loop circuit to transmit a corresponding impulse to the local switches.

Figure 11:
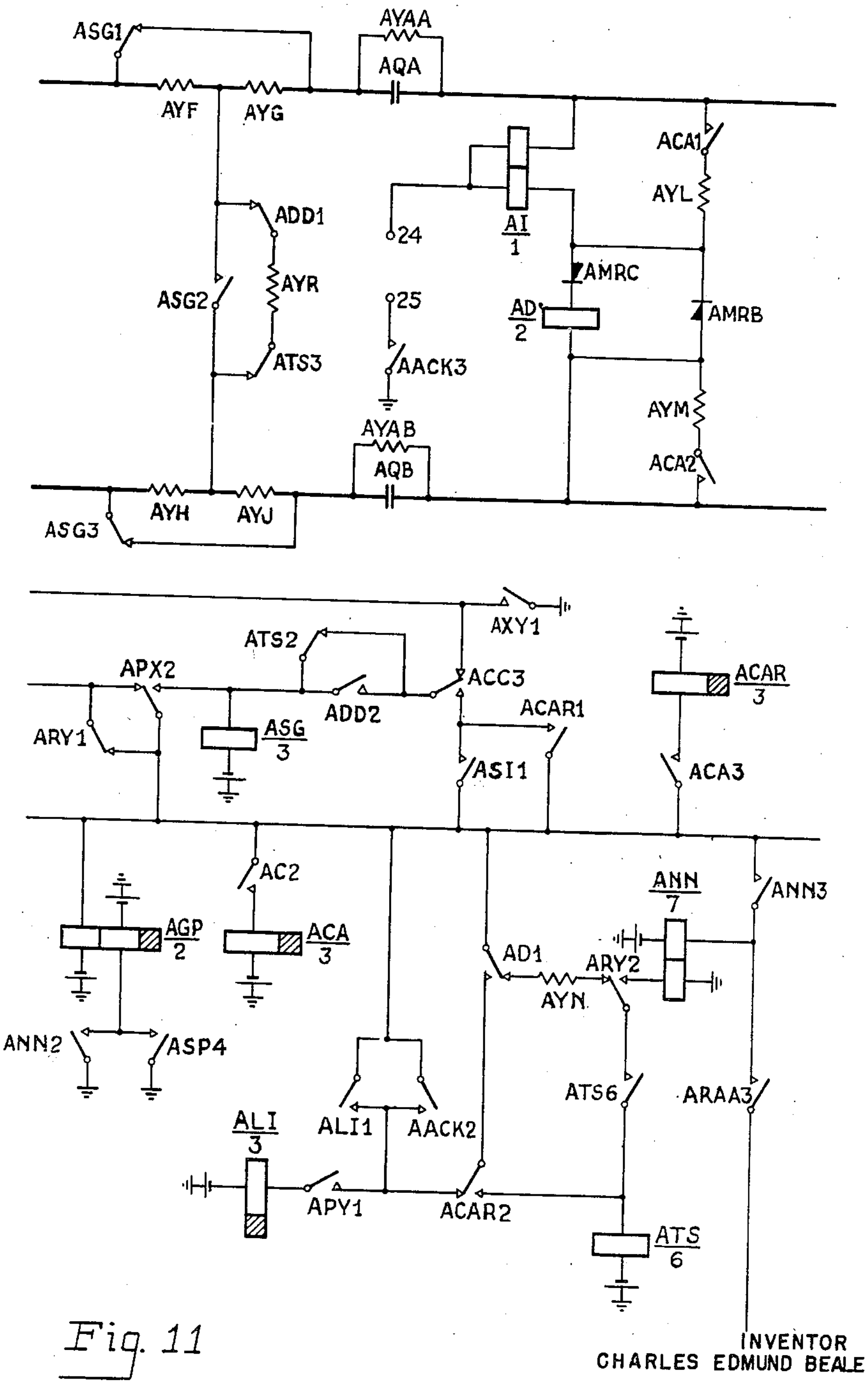
Figure 12:
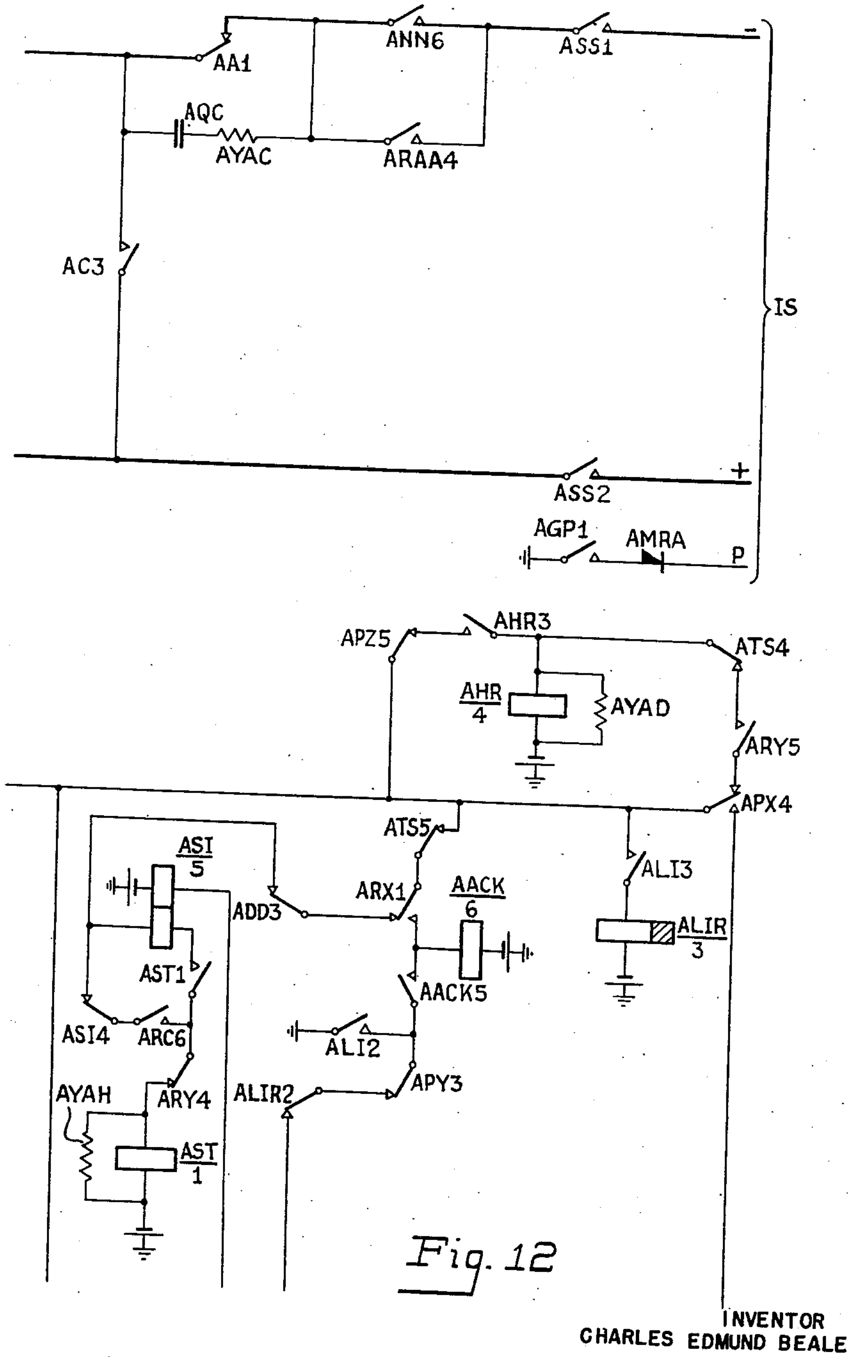

Relay AH at contacts AH1, Fig. 10, removes the short-circuit from relay AC which thereupon operates and at contacts AC1 completes a holding circuit for relay ASS in view of the release of relay AI during impulsing, at contacts AC2, Fig. 11, energises relay ACA and at contacts AC3, Fig. 12, short-circuits relays AI and AD to improve the impulsing conditions. Relay ACA at its contacts ACA1 and ACA2 prepares circuits for re-introducing the impedance of relays AI and AD in two stages the first of which involves resistors AYL and AYM, and at contacts ACA3 energises the relay ACAR. This relay at contacts ACAR1 completes a further circuit for relay ASG to maintain the line splitting condition, at contacts ACAR2 prepares a circuit for relay ATS which will not become effective under the conditions assumed, and at contacts ACAR3, Fig. 15, opens a further point in the circuit of relay APX. The train of voice frequency impulses is thus converted into a corresponding train of interruptions in the outgoing loop and relay AC remains operated throughout the train. At the end of the train relays AC, ACA and ACAR release in turn though without producing any effect at this stage apart from the re-inclusion in the loop of relays AI and AD.

Subsequent trains of impulses are transmitted in a similar manner and when all impulses have been delivered, or if the subscriber delays to dial for so long that the impulse regenerator discharges all its stored impulses, the Y signal for rendering the equipment insensitive to further X pulses is transmitted. This operates relay AY and a circuit is then completed from earth over contacts ASI2, AY1, AX1, ANN4, ARC5, lower winding of relay ADD, upper winding of relay ASI to battery. Relay ASI is accordingly held operated and relay ADD also operates, but at this time only contacts ADD3, Fig. 12, are effective. These contacts open the series circuit for relays ASI and AST whereupon relay AST releases. On the termination of the Y frequency signal, the maintaining circuit for relay ASI is opened and it releases as well as relay ADD. Consequently relays AA and AH are again disconnected and are therefore unresponsive to any fortuitous X signals which may appear on the line and also relay ASG is released to remove the shunt across the line.

The connection has now been set up and the called party is rung in the usual manner. When he replies, current is reversed back over the speaking conductors to operate relay AD which at contacts AD1 prepares a circuit for relay ALI which will not be effective in these circumstances and at contacts AD2, Fig. 15, energises relay ADD. This thereupon at contacts ADD1, Fig. 11, disconnects resistor AYR from in shunt of the line so as to improve the transmission characteristics, at contacts ADD2 prepares an alternative circuit for relay ASG, at contacts ADD3, Fig. 12, opens a point in the circuit of relay AST to prevent operation of this relay when supervisory signals are subsequently transmitted and at contacts ADD4, Fig. 15, completes a circuit for relay APX from earth at wiper ATT1 in home position, contacts ABZ5, APZ6, AHR4, ADD4, ASI5, ACAR3, relay APX, contacts ARAA5, ARY6, ANN7, resistor AYA to battery. Relay APX thereupon at contacts APX1, Fig. 13, completes a self-interrupted circuit for the magnet ATTM over wiper ATT4, at contacts APX2, Fig. 11, energises relay ASG and opens one of the alternative points in the holding circuit for relay ARAA, at contacts APX3, Fig. 14, prepares a circuit for relay ASX and at contacts APX4, Fig. 12, and APX5, Fig. 15, completes a locking circuit for itself. The switch ATT operates in a generally similar manner to the switch TT in the outgoing relay set and when it steps off-normal relays ASX and ASY are operated in series over wiper ATT3 and a circuit is prepared for relay AIG over wiper ATT5. This relay operates when the springs AIMP next open and thereupon at contacts AIG1 prepares a holding circuit for itself in the home position of the switch, at contacts AIG2 opens a point in the initial short-circuiting connection round its winding and extends the impulse springs to the magnet ATTM and at contacts AIG3 prepares a circuit for relay ASP. When the impulse springs next close, this circuit is completed and relay ASP at contacts ASP1 and ASP3, Fig. 10, connects a compound signal to line, at contacts ASP2 connects up battery through the high value resistor AYT for contact-wetting purposes, at contacts ASP4, Fig. 11, completes an alternative circuit for relay AGP and at contacts ASP5, Fig. 14, completes a holding circuit for itself and relays ASX and ASY by way of its left-hand winding to wiper ATT3. It will be seen that X frequency is connected up from common lead 21 by way of resistors AYC and AYQ, contacts ASX1 and resistor AYD, while Y frequency is connected up from common lead 20 over resistor AYB, contacts ASY1, and resistors AYP and AYD, resistor AYE being included in the return to earth by way of the common lead 22. The switch ATT now continues to step at the rate of 10 steps per second and when it advances to contact 5 the original circuit for relays ASP, ASX and ASY is opened so as to terminate the compound pulse but relay ASX is then operated over contacts APX3 and its upper winding. When the impulse springs AIMP next close, relay ASP is again operated over contacts AIG3 and in view of the fact that relay ASX is operated a short X signal is transmitted to line. The switch continues to step from position 6 to position 13 from earth supplied initially over contacts ACC1 in series with the low resistance relay AIGZ. This relay performs the same functions as the similar relay IGZ in Fig. 6 and by connecting up direct earth at contacts AIGZ1 avoids any danger of a clipped pulse. It will be seen that in positions 8—12 the driving circuit includes also contacts ABZ1. When the switch wipers reach position 13, the driving circuit extends over contacts APX1 and AIG1 and hence if conditions remain the same the transmission of a further called subscriber answer signal is initiated.

In the normal operation however as soon as the first signal is received, an acknowledgment signal comprising compound followed by short Y will be transmitted back to the equipment of Figs. 10—15. The compound signal can become effective as soon as the switch ATT reaches position 6 and as previously described causes the operation of relay AXY followed by the release of relay ACC and the operation of relay ARC and the driving circuit is now opened at contacts ACC1 and AXY2. Relay AXY releases during the short pause following the compound signal but relay ARC remains energised due to the slugging effect of its short-circuited winding and consequently when the Y signal is subsequently received a circuit is completed from earth over contacts AXY4, ARC3, ASI2, AY1, AX1, ANN4 and ARC5 for relay ARY. This relay thereupon at contacts ARY1, Fig. 11, opens the remaining alternative point in the circuit of relay ARAA so that this relay releases, at contacts ARY2 prepares a holding circuit for relays ATS and ANN, at contacts ARY3, Fig. 14, opens the circuit of relay ABZ and completes a holding circuit for relay ARC, at contacts ARY4, Fig. 12, opens the circuit of relay AST to ensure that this relay shall not come into operation at this stage, at contacts ARY5 prepares a circuit for relay AHR and at contacts ARY6, Fig. 15, completes an alternative circuit for relay APX. On the termination of the Y signal, relay ARY releases followed by relay ARC whereupon relay ACC again operates and relay APX releases since its initial circuit over contacts ARAA5 is now open. Consequently the stepping of the switch ATT which is resumed on the re-operation of relay ACC is terminated when it reaches its next home position and the transmission of the supervisory signal therefore ceases.

Figure 13:
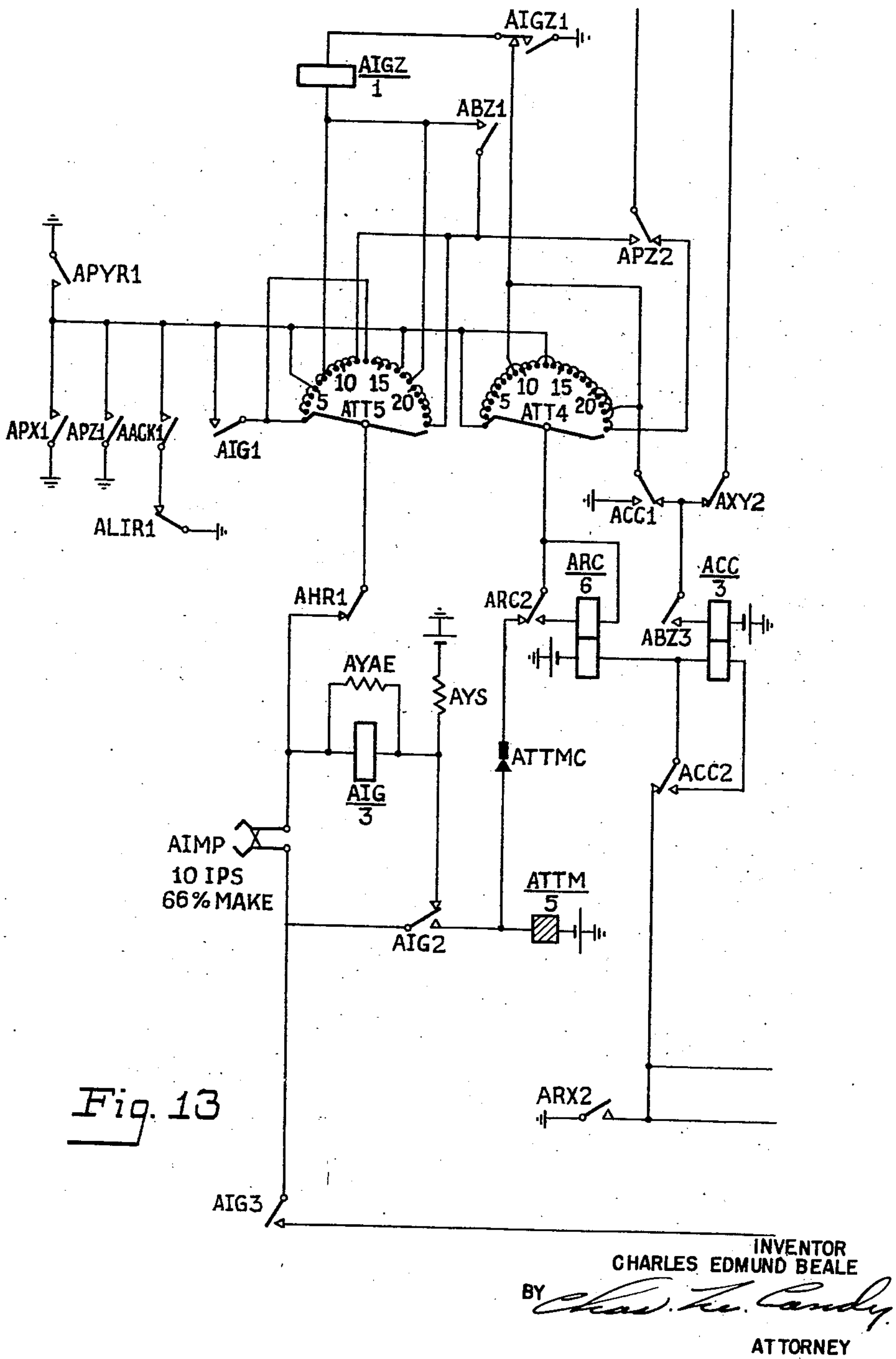
Figure 14:
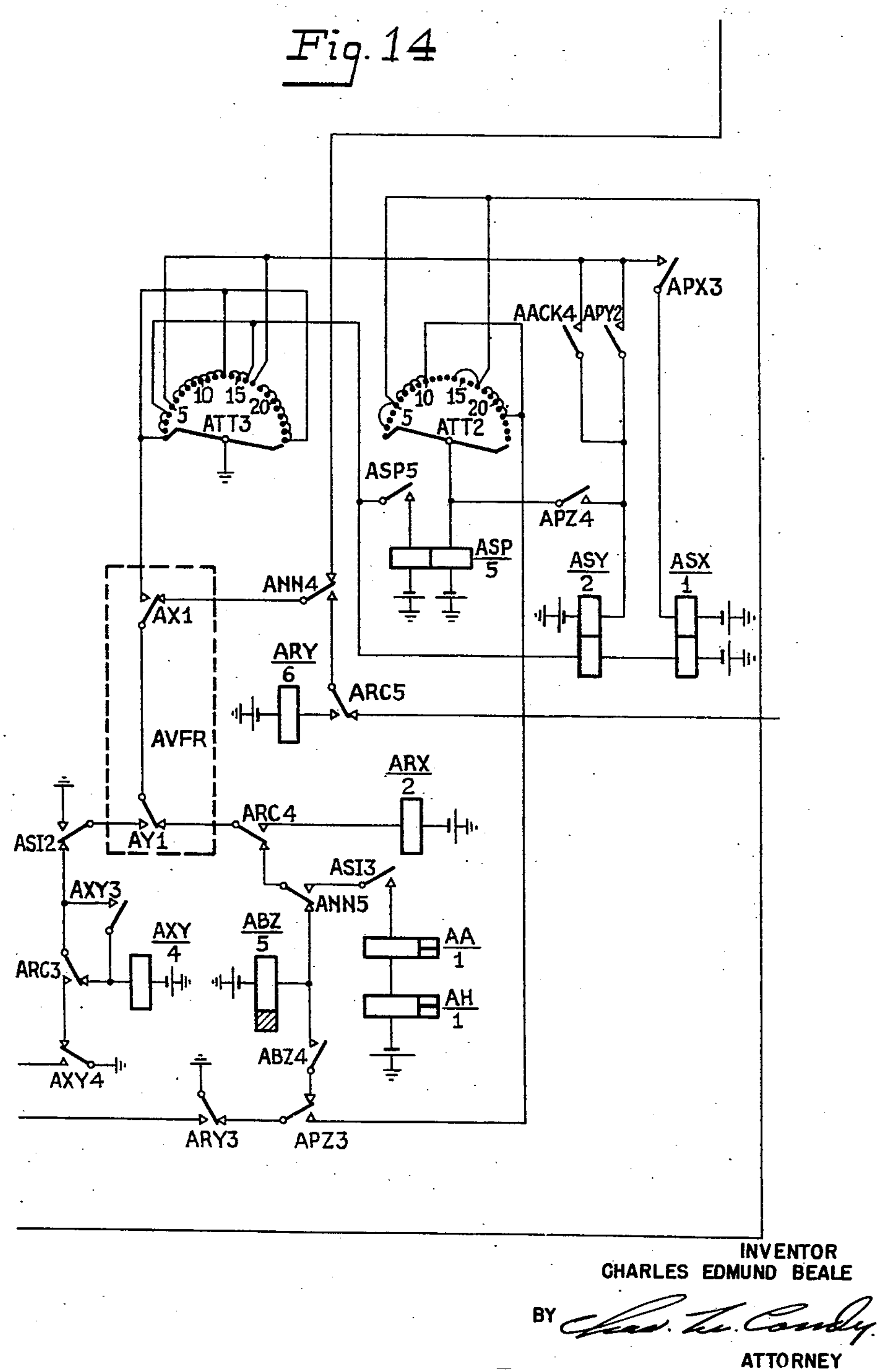

At the end of the conversation if the called party hangs up first, the current flow over the line is reversed back to normal and relay AD releases and brings down relay ADD. Thereupon a circuit is completed for relay APY from earth over wiper ATT1, contacts ABZ5, APZ6, AHR4, ADD4, ALIR3, APY5, winding of relay APY, contacts ARAA5, ARY6, ANN7, resistor AYA to battery. Relay APY operates and at contacts APY1, Fig. 11, prepares a circuit for relay ALI, at contacts APY2, Fig. 14, prepares a circuit for relay ASY, at contacts APY3, Fig. 12, opens a point in the locking circuit for relay AACK, at contacts APY4, Fig. 15, prepares a locking circuit for itself, and at contacts APY5 closes another point in this locking circuit and includes relay APYR in its own circuit. This latter relay on operating, at contacts APYR1, Fig. 13, provides the usual kick-off circuit for starting the operation of the switch ATT. This proceeds in a similar manner to that previously described when relay APX operated and in position 2 relays ASX and ASY are operated in series and also in this position relay ASP is operated when the impulse springs AIMP next close after relay AIG has operated. The usual compound pulse is therefore transmitted to line and when position 5 is reached relay ASP is again operated over its right-hand winding and in this case a circuit is completed over contacts APY2 for relay ASY so that a Y frequency pulse is transmitted. Relay APY is maintained energized in all positions of switch ATT and hence when it reaches the home position the signal is repeated if conditions remain the same.

If the called party desires to attract the attention of the operator and therefore again removes his receiver, relay AD will re-operate and again bring up relay ADD. Moreover, at contacts AD1, Fig. 11, a circuit is completed for relay ALI which at contacts ALI1 completes a locking circuit for itself, at contacts ALI2, Fig. 12, prepares a holding circuit for relay AACK and at contacts ALI3 energises relay ALIR. This relay thereupon at contacts ALIR1, Fig. 13, opens a point in one of the driving circuits for the switch ATT, at contacts ALIR2, Fig. 12, opens a point in a further locking circuit for relay AACK and at contacts ALIR3, Fig. 15, opens a point in the initial energising circuit of relay APY. Hence, when the switch ATT next reaches its home position, no circuit is completed for relay APY and it releases together with relay APYR, which opens the driving circuit. Relay APY also releases relay ALI which falls away slowly and opens the circuit of relay ALIR which is also slow to release. Consequently, the transmission of the clear back signal is terminated if the called party now maintains his receiver off the rest. If, however, he desires to recall the operator and therefore again depresses his switchhook, relays AD and ADD again fall away and consequently the initial circuit for relay APY is again completed and relay APYR subsequently operates and initiates the movement of the switch ATT to repeat the clear back signal. In any event, the effect is that an additional pause represented by the combined release times of relays ALI and ALIR is introduced between repetitions of the signal and as already explained this is sufficient to enable relay FC in the outgoing relay set to de-energise and a flash is transmitted to the calling operator.

Assuming now however that the parties have finished their conversation so that a normal clear back signal is being transmitted, when the calling party hangs up the clear forward signal is transmitted which also comprises compound followed by short Y. When this is received, which can only take place when the switch ATT is clear of positions 2—5, relay AXY is operated as usual by the compound signal and releases relay ACC and brings up relay ARC. When the Y signal is subsequently received, relay ARY operates. In this case contacts ARY1 and ARY2 perform no useful function, contacts ARY3 maintain relay ARC, contacts ARY4 prevent the operation of relay AST, contacts ARY5, Fig. 12, complete a circuit for relay AHR and contacts ARY6, Fig. 15, open the circuit of relay APY. Relay AHR at contacts AHR1 opens the circuit of relay AIG and the pulsing circuit for the switch magnet, at contacts AHR2, Fig. 10, prepares a homing circuit for the switch, at contacts AHR3, Fig. 12, completes a locking circuit for itself, and at contacts AHR4, Fig. 15, prepares a circuit for relay APZ. At the end of the signal, relay ARY releases followed by relay ARC and relay ACC re-operates, and the switch is then stepped by self-interruption from position 9 into its home position. When this is reached the circuit for relay APZ is completed and on operating, at contacts APZ1, Fig. 13, it completes a new kick-off circuit for the switch ATT, at contacts APZ2 opens the previous homing circuit and prepares an alternative circuit for relay AIG, at contacts APZ3, Fig. 14, opens the circuit of relay ABZ and prepares for the prolonged connection of earth to wiper ATT2, at contacts APZ4 prepares a circuit for relay ASY, at contacts APZ5, Fig. 12, opens the circuit of relay AHR, at contacts APZ6, Fig. 15, completes a locking circuit for itself and at contacts APZ7 prepares a locking circuit for itself in positions 2—10 of wiper ATT1. The switch ATT is accordingly set in operation after the release of relay AHR and in the usual manner causes a compound signal to be transmitted back followed by a Y signal. In this case, however, owing to the fact that relay APZ is operated instead of APY, relays ASP and ASY are maintained operated in positions 5—10 of the switch and hence a signal is transmitted of sufficient duration to cause the release of relay BZ in the outgoing relay set as already described. When the switch steps to position 11, relay APZ is released and a homing circuit is then completed over contacts APZ2 to drive it by self-interruption to its normal position. In the meantime, relay ABZ has been released owing to the prolonged opening of its circuit by relay APZ and this relay initiates the release of the incoming relay set by removing earth from the holding lead at contacts ABZ2 whereupon relay ANN is released. This relay opens the forward loop to release the operated switches and relay AI then falls away and releases relay ASS. Relay AGP is released and removes earth from the P conductor when relay ASP is released at the end of the long Y signal.

If the calling party hangs up first, the only difference in the operation is that the switch ATT is now in its home position so that the immediate operation of relay AHR is produced followed by the operation of relay APZ to transmit the release signal. In this case therefor the clear back signal is not transmitted and the connection is released independently of the called party.

Consider now the case in which a calling operator desires to effect a switching operation such as re-ringing, and for this purpose throws the appropriate key which as already described causes the transmission of compound followed by short X which is repeated until acknowledged. Two cases have to be considered, first, the case in which the signal is intended to produce trunk offering and/or breakdown, in which case it is transmitted in the face of busy tone but no X or Y frequencies will be on the line, and second, the case in which the signal is intended to produce re-ringing after the called party has hung up in which circumstances the equipment at the incoming end will be transmitting a clear back signal.

In the first case, in which the equipment at the incoming end is quiescent, the transmission of the compound prefix will as usual cause the energisation of relay AXY followed by the release of relay ACC and the operation of relay ARC. When the X signal is subsequently received, relay ARX will be energised and thereupon at contacts ARX1, Fig. 12, energises relay AACK and at contacts ARX2, Fig. 13, completes the usual holding circuit for relay ARC. Relay AACK at contacts AACK1, Fig. 13, completes the usual kick-off circuit for the switch ATT, at contacts AACK2, Fig. 11, prepares a circuit for relay ALI which will not be operative in these circumstances since relay APY has not been operated, at contacts AACK3 connects a simplex earth to the line on the assumption that terminals 24 and 25 are strapped for this method of operation, at contacts AACK4, Fig. 14, prepares a circuit for relay ASY, at contacts AACK5 completes a locking circuit for itself to earth over wiper ATT1, and at contacts AACK6 prepares a further locking circuit for itself in positions 2—5 of the switch ATT. The switch ATT now advances in the usual manner and transmits back a compound prefix followed by a short Y signal in position 5 since relay ASY is then operated by way of contacts AACK4. When the switch reaches position 6, relay AACK is released and the switch steps on over the circuits previously traced to earth at contacts AIGZ1. The acknowledgment signal will have the effect of terminating the transmission of the signal from the outgoing end and the connection of earth to the line during the operated time of relay AACK will produce the necessary cut in or breakdown facilities.

In the other case in which the signal is intended to produce re-ringing, the switch ATT will already be in operation to transmit the clear back signal in consequence of the operation of relays APY and APYR. Accordingly the forward signal can only become operative when the switch ATT has passed positions 2—5 and has the effect of arresting the switch, while again relay AACK is operated. In this case, however, relay ALI is operated and as before brings up relay ALIR. At the end of the signal, the switch resumes its movement and when it reaches its home position relays APY and APYR are released. Relay AL then falls away slowly followed by relay AACK and after a further interval by relay ALIR. The circuit of relay APY is then again completed and the sending of the clear back signal is resumed after an additional interval which has been sufficient to permit the release of relay FC to terminate the forward signal as already described.

It may be mentioned at this point that if the selector should seize a short-circuited trunk, the voice frequency receiver would be disabled from receiving the clear forward signal and hence no release signal would be sent back nor would the incoming relay set itself be released. Such a lock-up is prevented by the fact that if such a faulty trunk is encountered, relay AI will be shunted down and will therefore release relay ASS which opens the forward loop and therefore removes the shunt from the voice frequency receiver and thus permits it to respond to signals in the usual way.

In the case of transit calls, that is to say where two or more voice frequency trunks are used in tandem, it is desirable that the voice frequency impulses should be transmitted straight through and that there should be no conversion to D. C. impulses at the intermediate exchange. This is effected by a momentary reversal of current over the loop since, as already explained in connection with the outgoing relay set, when the outgoing relay set is seized over the transmit means of access current is applied in the reverse direction through the windings of relay TR. It is arranged that relays AC and ACA in the incoming relay set will release before the C relay in the incoming selector and this will render relay AD effective to respond to the momentary reversal during the time that relay ACAR still remains operated. Relay AD therefore operates momentarily and as usual brings up relay ADD and also completes a circuit over contacts AD1 and ACAR2 for relay ATS. This relay at contacts ATS1, Fig. 10, opens the circuit of relay AC and provides a holding circuit for relay ASS, at contacts ATS2, Fig. 11, prevents the operation of relay ASG after relay ADD de-energises, at contacts ATS3 removes the shunt represented by resistor AYR from across the line, at the contacts ATS4, Fig. 12, prevents the operation of relay AHR, at contacts ATS5 prevents the operation of relays AST and AACK and at contacts ATS6 prepares a locking circuit for itself. The incoming relay set is thus placed in such a condition that though it can still respond to compound signals, it is impossible to energise relay ASI to introduce impulsing conditions, and moreover it cannot respond to a subsequent X signal. It will however respond to a Y signal but owing to the operation of contacts ATS4 this will produce no effect unless it is of sufficient duration to cause the release of relay ABZ. It will be seen that relay ATS is only locked up on the release of relay AD so that if it should happen that a called party removes his receiver while relay ACAR is still energised, relay ATS will only operate momentarily and no disturbance will be caused. When the connection is to be released and a long Y signal is transmitted, the locking circuit of relay ATS is altered so as to include the lower winding of relay ANN. This ensures that relay ANN will remain energised and thus maintain the loop after the de-energisation of relay ABZ and so prevent the signal being prematurely cut off from earlier parts of the connection.

I claim:

1. In a telephone system employing mixed systems of voice frequency and direct current impulsing for controlling the selective setting of automatic switches, an incoming relay set arranged to be normally insensitive to voice frequency impulsing, an outgoing relay set including an impulse regenerator for storing and converting incoming direct current impulses to corresponding voice frequency impulses, a trunk line interconnecting said incoming and outgoing relay sets, means in said outgoing relay set operated in response to said regenerators initial storing operation for causing a conditioning signal to be sent forward, means in said incoming relay set operated in response to said conditioning signal for causing said incoming relay set to become sensitive to voice frequency impulses, means in said outgoing relay set operated in response to the termination of voice frequency impulsing by said regenerator for sending forward another conditioning signal, and means in said incoming relay set operated in response to the receipt of said other conditioning signal for rendering said incoming relay set insensitive to further voice frequency impulsing.

2. In a telephone system as claimed in claim 1 in which only two different voice frequencies are used to set up a connection therein and for transmitting supervisory signals and circuit means for transmitting supervisory signals comprising one or the other of said signalling frequencies preceded by a conditioning signal of predetermined length comprised of both signalling frequencies applied simultaneously.

3. A telephone system as claimed in claim 1 in which said incoming relay set includes means for converting incoming voice frequency impulses to corresponding direct current impulses suitable for operating said automatic switches.

4. In a telephone system employing voice frequency signals for the setting up and supervision of connections over a line having an incoming relay set at one end and an outgoing relay set including an impulse regenerator at the other end, said outgoing relay set being accessible over two separate paths, means in said outgoing relay set operated responsive to said outgoing relay set being seized over either of said two paths for sending a voice frequency seizing signal forward to said incoming relay set, means in said impulse regenerator for storing incoming direct current impulses and transmitting corresponding voice frequency impulses when said outgoing relay set is seized over one of said paths, a second means in said impulse regenerator operated in response to said initial storing operation when said outgoing relay set is seized over said one path for sending a different voice frequency signal forward to said incoming relay set just prior to the transmission of said voice frequency impulses, and a third means in said outgoing relay set operated in response to the seizure of said outgoing relay set over the other of said paths for automatically transmitting said different signal forward to said incoming relay set subsequent to the transmission of said seizure pulse.

5. In a telephone system as claimed in claim 1 including two separate paths over which said outgoing relay set may be seized, said impulse regenerator operated to store incoming direct current impulses and transmit corresponding voice frequency impulses when said outgoing relay set is seized over one of said paths, and means in said outgoing relay set operated in response to said outgoing relay set being seized over the other of said paths for rendering said impulse regenerator inoperative.

6. In a telephone system employing mixed systems of voice frequency and direct current signalling for supervision and for controlling the selective setting of automatic switches, an incoming relay set, an outgoing relay set, a trunk line connecting said outgoing and incoming relay sets, an impulse regenerator in said outgoing relay set for storing incoming direct current impulses and transmitting corresponding voice frequency impulses over said trunk line to said incoming relay set, means in said impulse regenerator for transmitting a first voice frequency signal forward just prior to the initial transmission of said voice frequency impulses, a second means in said impulse regenerator operated should be incoming direct current impulses be inadvertently interrupted for a time long enough for said regenerator to transmit voice frequency signals corresponding to all the direct current impulses stored therein for transmitting a second voice frequency signal forward, said first means re-operated when said impulse regenerator re-operates to transmit voice frequency impulses in response to the receipt of subsequent direct current impulses to again transmit said first signal forward, said second means re-operated at the conclusion of voice frequency impulsing to again transmit said second signal forward.

CHARLES EDMUND BEALE.

REFERENCES CITED

The following references are of record in the file of this patent:

UNITED STATES PATENTS

| Number | Name | Date |
|---|---|---|
| 2,154,776 | Saville | Apr. 18, 1939 |
| 2,188,461 | McClew | Jan. 30, 1940 |
| 2,302,071 | Taylor | Nov. 17, 1942 |
| 2,374,884 | Newby | May 1, 1945 |
| 2,383,541 | Gillings | Aug. 25, 1945 |
| 2,407,150 | Gillings et al. | Sept. 3, 1946 |
| 2,424,577 | Mauge | July 29, 1947 |

FOREIGN PATENTS

| Number | Country | Date |
|---|---|---|
| 489,609 | Great Britain | July 25, 1938 |